(12) United States Patent
Takahashi et al.

(10) Patent No.: US 12,457,279 B2
(45) Date of Patent: Oct. 28, 2025

(54) COMMUNICATION APPARATUS AND COMMUNICATION METHOD AS WELL AS PROGRAM

(71) Applicant: Sony Semiconductor Solutions Corporation, Kanagawa (JP)

(72) Inventors: Hiroo Takahashi, Kanagawa (JP); Toshihisa Hyakudai, San Diego, CA (US); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1101 days.

(21) Appl. No.: 17/260,391

(22) PCT Filed: Dec. 6, 2019

(86) PCT No.: PCT/JP2019/047761
§ 371 (c)(1),
(2) Date: Jan. 14, 2021

(87) PCT Pub. No.: WO2020/129685
PCT Pub. Date: Jun. 25, 2020

(65) Prior Publication Data
US 2021/0306445 A1 Sep. 30, 2021

(30) Foreign Application Priority Data
Dec. 20, 2018 (JP) .................. 2018-238300

(51) Int. Cl.
*H04L 69/324* (2022.01)
*H04L 69/22* (2022.01)
*H04L 69/323* (2022.01)

(52) U.S. Cl.
CPC ............ *H04L 69/324* (2013.01); *H04L 69/22* (2013.01); *H04L 69/323* (2013.01)

(58) Field of Classification Search
CPC ..... H04L 69/324; H04L 69/22; H04L 69/323; H04L 69/18; H04L 69/16; H04L 69/169;
(Continued)

(56) References Cited

U.S. PATENT DOCUMENTS

2006/0268878 A1* 11/2006 Jung .................. H04L 45/16
370/349
2007/0041423 A1 2/2007 Nygardh
(Continued)

FOREIGN PATENT DOCUMENTS

CN 102469277 A 5/2012
CN 106575977 A 4/2017
(Continued)

OTHER PUBLICATIONS

Draft MIPI Alliance Specification for Camera Serial Interface 2 (CSI-2), Draft MIPI Alliance Specification for CSI-2 Draft Version 1.01.00 Revision 0.04—Apr. 2, 2009, p. 21-23, 46-50.
(Continued)

*Primary Examiner* — Oussama Roudani
*Assistant Examiner* — Rasha K Fayed
(74) *Attorney, Agent, or Firm* — Michael Best & Friedrich LLP

(57) ABSTRACT

A communication apparatus, method and program that accommodate diverse usage are disclosed. In one example, a packet header is generated according to a CSI-2 standard. The packet header includes setting information of conditions set for data to be transmitted in a packet is placed. An extended header is also generated, into which the setting information is to be placed separately from the packet header. Then, into an unused region defined as a region that is not used in the existing CSI-2 standard with respect to a data type that is the setting information indicative of a type of the data to be transmitted in the packet, extension mode (Continued)

setting information indicative of whether or not an extension mode using the extended header is used is placed. The disclosed technology can be applied, for example, in a mobile device or in an in-vehicle camera.

20 Claims, 20 Drawing Sheets

(58) Field of Classification Search
CPC ....... H04L 45/16; H04L 45/00; H04L 1/0088; H04L 12/5601; H04L 65/611; H04L 65/65; H04L 65/70; H04L 65/75; H04L 65/4076; H04L 67/51; H04L 67/02; H04L 63/0428; H04W 8/26; H04W 88/02; H04W 28/065; H04W 28/06; H04W 28/12; H04N 19/30; H04N 21/43637; H04N 21/64372; H04N 21/2362; H04N 21/2381; H04N 21/64707; H04N 21/2361; H04N 21/4302; H04N 21/4126; H04N 21/41265; H04N 21/2343; H04N 21/235; H04N 21/27; H04N 23/667; H04N 23/661; G06F 13/10; G06F 13/38; G06F 13/385; G06F 9/4413; G06F 8/65
See application file for complete search history.

(56) References Cited

U.S. PATENT DOCUMENTS

| | | | | |
|---|---|---|---|---|
| 2008/0247397 | A1* | 10/2008 | Gillet | H04L 45/52 |
| | | | | 370/392 |
| 2010/0226315 | A1* | 9/2010 | Das | H04W 28/065 |
| | | | | 370/328 |
| 2012/0011569 | A1* | 1/2012 | Chou | H04W 12/106 |
| | | | | 726/4 |
| 2012/0189069 | A1* | 7/2012 | Iannuzzelli | H04N 21/435 |
| | | | | 375/259 |
| 2012/0282927 | A1* | 11/2012 | Park | H04W 60/06 |
| | | | | 455/435.1 |
| 2016/0014670 | A1* | 1/2016 | Kim | H04W 4/06 |
| | | | | 370/329 |
| 2017/0041423 | A1* | 2/2017 | Kitazato | H04L 69/22 |
| 2017/0054520 | A1* | 2/2017 | Kwak | H04N 21/814 |
| 2017/0201746 | A1* | 7/2017 | An | H04N 17/002 |
| 2017/0359499 | A1* | 12/2017 | Thanigasalam | H04N 23/667 |
| 2017/0366254 | A1* | 12/2017 | Gao | H04B 10/03 |
| 2018/0026748 | A1* | 1/2018 | Jo | H04L 67/12 |
| | | | | 714/776 |
| 2019/0045034 | A1* | 2/2019 | Alam | H04W 40/24 |
| 2019/0058568 | A1* | 2/2019 | Taniguchi | H04W 72/0453 |
| 2019/0149751 | A1* | 5/2019 | Wise | H04N 7/08 |
| | | | | 348/222.1 |
| 2019/0274032 | A1* | 9/2019 | Chatterjee | H04L 5/00 |
| 2020/0275046 | A1* | 8/2020 | Takahashi | H04N 19/70 |
| 2021/0149588 | A1* | 5/2021 | Jin | G06F 3/0604 |

FOREIGN PATENT DOCUMENTS

| | | |
|---|---|---|
| EP | 1085722 A | 3/2001 |
| JP | 2012-520020 A | 8/2012 |
| JP | 2017-211864 A | 11/2017 |
| TW | 201608472 A | 3/2016 |

OTHER PUBLICATIONS

International Search Report (PCT/ISA/210), International Application No. PCT/JP2019/047761, dated Jan. 29, 2020.

Written Opinion of the International Search Authority (PCT/ISA/237), International Application No. PCT/JP2019/047761, dated Feb. 10, 2020.

* cited by examiner

FIG.19
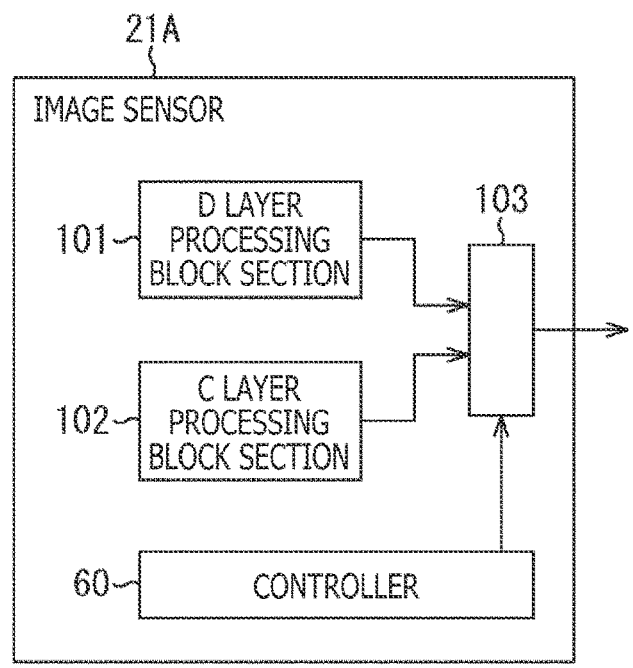
A
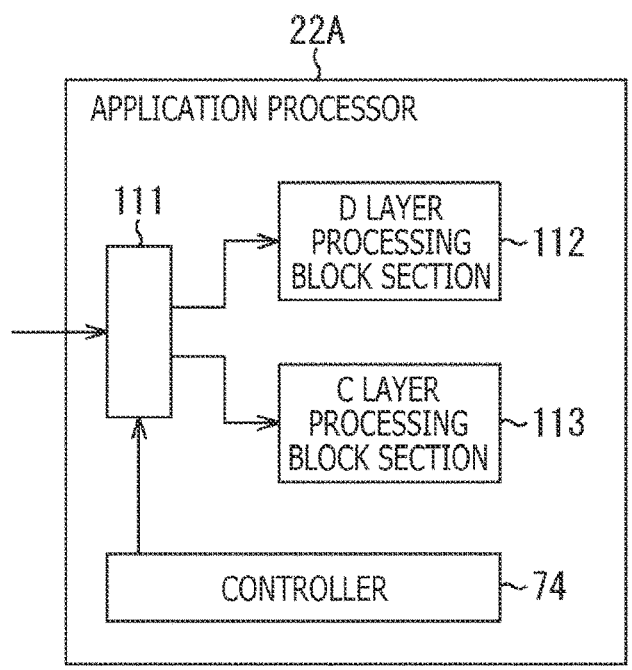
B

COMMUNICATION APPARATUS AND COMMUNICATION METHOD AS WELL AS PROGRAM

TECHNICAL FIELD

The present disclosure relates to a communication apparatus and a communication method as well as a program, and particularly to a communication apparatus and a communication method as well as a program that make it possible to deal with more diverse uses.

BACKGROUND ART

CSI (Camera Serial Interface)-2 ver4.0 whose standardization currently proceeds defines two packet structures including a packet structure in which the C-PHY is used for the physical layer and another packet structure in which the D-PHY is used for the physical layer.

Further, since the CSI-2 standard has not only been used in mobile devices but also been applied to various uses such as in-vehicle uses and IoT (Internet of Things) uses, it is supposed that, with the existing packet structure, the CSI-2 fails to deal with such uses. Therefore, the MIPI (Mobile Industry Processor Interface) alliance is investigating extension of the packet structure in terms of an existing packet header and packet footer in order to make it possible to deal with various uses.

Meanwhile, PTL 1 proposes a system that can use the CSI-2 standard to decrease the number of data buses when to connect a processing apparatus and a plurality of image sensors to each other.

CITATION LIST

Patent Literature

[PTL 1]
Japanese Patent Laid-Open No. 2017-211864

SUMMARY

Technical Problem

As described above, it is investigated to extend the packet structure of a packet according to the CSI-2 standard, and in such extension of the packet structure, it is demanded to make it possible to transmit an increased amount of information to deal with a variety of uses while the compatibility of the existing CSI-2 standard is maintained.

The present disclosure has been made in view of such a situation as described above and makes it possible to deal with an increased variety of uses.

Solution to Problem

A communication apparatus of a first aspect of the present disclosure includes a packet header generation section configured to place setting information indicative of a condition set for data to be transmitted in a packet to generate a packet header in compliance with an existing CSI-2 standard, and an extended header generation section configured to generate an extended header into which the setting information is to be placed separately from the packet header. The packet header generation section places, into an unused region defined as a region that is not used in the existing CSI-2 standard with respect to a data type that includes the setting information indicative of a type of the data to be transmitted in the packet, extension mode setting information indicative of whether or not an extension mode using the extended header is used.

A communication method or a program of the first aspect of the present disclosure includes placing setting information indicative of a condition set for data to be transmitted in a packet to generate a packet header in compliance with an existing CSI-2 standard, and generating an extended header into which the setting information is to be placed separately from the packet header. Extension mode setting information indicative of whether or not an extension mode using the extended header is used is placed into an unused region defined as a region that is not used in the existing CSI-2 standard with respect to a data type that includes the setting information indicative of a type of the data to be transmitted in the packet.

In the first aspect of the present disclosure, setting information indicative of a condition set for data to be transmitted in a packet is placed to generate a packet header in compliance with an existing CSI-2 standard, and an extended header into which the setting information is to be placed is generated separately from the packet header. Then, extension mode setting information indicative of whether or not an extension mode using the extended header is used is placed into an unused region defined as a region that is not used in the existing CSI-2 standard with respect to a data type that includes the setting information indicative of a type of the data to be transmitted in the packet.

A communication apparatus of a second aspect of the present disclosure includes a packet header detection section configured to detect a packet header in which setting information indicative of a condition set for data to be transmitted in a packet is placed, according to an existing CSI-2 standard, and an interpretation section configured to interpret the setting information placed in an extended header separate from the packet header. The packet header detection section causes switching to be performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is used.

A communication method or a program of the second aspect of the present disclosure includes detecting a packet header in which setting information indicative of a condition set for data to be transmitted in a packet is placed, according to an existing CSI-2 standard, and interpreting the setting information placed in an extended header separate from the packet header. Switching is performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is used.

In the second aspect of the present disclosure, a packet header in which setting information indicative of a condition set for data to be transmitted in a packet is placed, is detected according to an existing CSI-2 standard, and the setting information placed in an extended header separate from the packet header is interpreted. Then, switching is performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is used.

BRIEF DESCRIPTION OF DRAWINGS

FIG. 19 depicts block diagrams of a modification of a configuration for switching the D-PHY and the C-PHY.

DESCRIPTION OF EMBODIMENTS

In the following, particular embodiments to which the present technology is applied are described in detail with reference to the drawings.
<Example of Configuration of Communication System>

Figure 1:
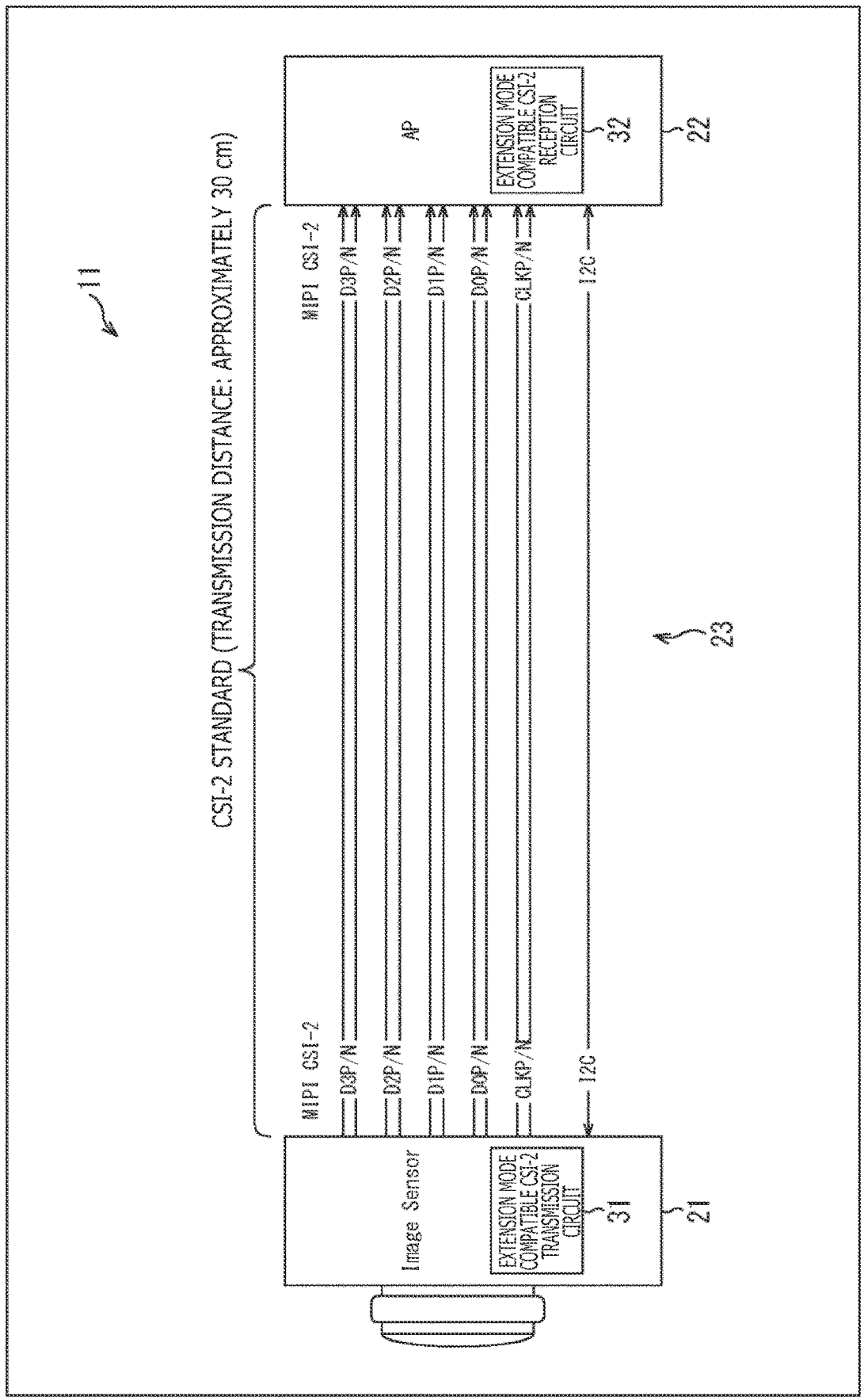
FIG. 1 is a block diagram depicting an example of a configuration of a first embodiment of a communication system to which the present technology is applied.

FIG. 1 is a block diagram depicting an example of a configuration of a first embodiment of a communication system to which the present technology is applied.

As depicted in FIG. 1, the communication system 11 is configured from an image sensor 21 and an application processor 22 connected to each other by a bus 23. For example, the communication system 11 is used for CSI-2 connection in the inside of an existing mobile device such as what is called a smartphone.

The image sensor 21 is configured such that an extension mode compatible CSI-2 transmission circuit 31 is incorporated together with, for example, a lens and an imaging device (either of them is not depicted). For example, the image sensor 21 transmits image data regarding an image acquired by imaging by the imaging device to the application processor 22 by the extension mode compatible CSI-2 transmission circuit 31.

The application processor 22 is configured such that an extension mode compatible CSI-2 reception circuit 32 is incorporated together with an LSI (Large Scale Integration) that performs processes according to various applications to be executed by the mobile device that includes the communication system 11. For example, the application processor 22 receives image data transmitted from the image sensor 21, by using the extension mode compatible CSI-2 reception circuit 32, and can perform a process according to the application for the image data by using the LSI.

The bus 23 is a communication path for transmitting a signal in compliance with the CSI-2 standard, and the transmission distance over which the bus 23 can transmit a signal is approximately 30 cm, for example. Further, the bus 23 connects the image sensor 21 and the application processor 22 to each other by a plurality of signal lines (I2C, CLKP/N, D0P/N, D1P/N, D2P/N, and D3P/N) as depicted in FIG. 1.

The extension mode compatible CSI-2 transmission circuit 31 and the extension mode compatible CSI-2 reception circuit 32 are ready for communication by an extension mode extended from the CSI-2 standard and can perform transmission and reception of a signal between them. It is to be noted that detailed configurations of the extension mode compatible CSI-2 transmission circuit 31 and the extension mode compatible CSI-2 reception circuit 32 are described later with reference to FIGS. 9 and 10.

Figure 2:
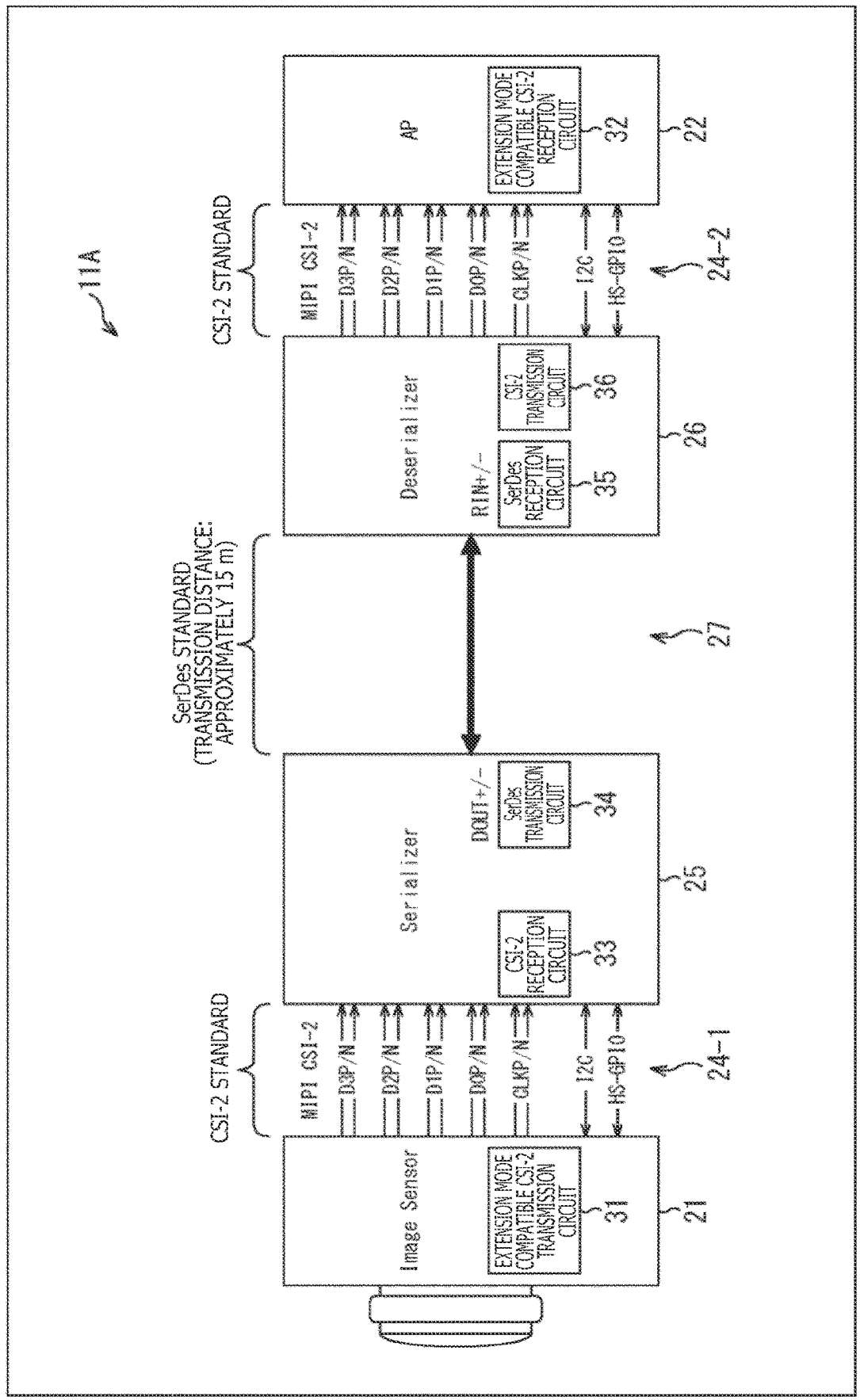
FIG. 2 is a block diagram depicting an example of a configuration of a second embodiment of a communication system to which the present technology is applied.

FIG. 2 is a block diagram depicting an example of a configuration of a second embodiment of the communication system to which the present technology is applied.

As depicted in FIG. 2, a communication system 11A is configured such that the image sensor 21 and a serializer 25 are connected to each other by a bus 24-1 while the application processor 22 and a deserializer 26 are connected to each other by a bus 24-2 and such that the serializer 25 and the deserializer 26 are connected to each other by a bus 27. For example, the communication system 11A is used for connection in an existing in-vehicle camera.

Here, the image sensor 21 and the application processor 22 are configured similarly to the image sensor 21 and the application processor 22 of FIG. 1, respectively, and detailed description of them is omitted.

The buses 24-1 and 24-2 are communication paths for transmitting a signal in compliance with the CSI-2 standard, similarly to the bus 23 of FIG. 1, and include a plurality of signal lines (HS-GPIO, I2C, CLKP/N, D0P/N, D1P/N, D2P/N, and D3P/N) as depicted in FIG. 2.

The serializer 25 includes a CSI-2 reception circuit 33 and a SerDes (Serializer Deserializer) transmission circuit 34. For example, the serializer 25 acquires a bit-parallel signal transmitted thereto from the image sensor 21, by communication in compliance with the CSI-2 standard performed by the CSI-2 reception circuit 33 with the extension mode compatible CSI-2 transmission circuit 31. Then, the serializer 25 converts the acquired signal into a bit-serial signal, and the SerDes transmission circuit 34 performs communication with the SerDes reception circuit 35 by one lane to transmit the signal to the deserializer 26.

The deserializer 26 includes a SerDes reception circuit 35 and a CSI-2 transmission circuit 36. For example, the deserializer 26 acquires a bit-serial signal transmitted by communication of the SerDes reception circuit 35 performed with the SerDes transmission circuit 34 by one lane. Then, the deserializer 26 converts the acquired signal into a bit-parallel signal, and the CSI-2 transmission circuit 36 performs communication in compliance with the ordinary CSI-2 standard with the extension mode compatible CSI-2 reception circuit 32 to transmit the bit-parallel signal to the application processor 22.

The bus 27 is a communication path for transmitting a signal in compliance with a SerDes standard other than the CSI-2, such as FPD (Flat Panel Display)-LINK III, and the transmission distance over which a signal can be transmitted is approximately 15 m.

The communication systems 11 and 11A configured in such a manner can transmit and receive data with a packet having a packet structure extended in such a manner as described later, by the extension mode compatible CSI-2 transmission circuit 31 and the extension mode compatible CSI-2 reception circuit 32. Consequently, they can be compatible with an increased variety of uses such as RAW24, SmartROI (Region of Interest), or GLD (Graceful Link Designation) as described later.

<First Structure Example of Packet Structure>

A first structure example of the packet structure of a packet that is used in communication between the extension mode compatible CSI-2 transmission circuit 31 and the extension mode compatible CSI-2 reception circuit 32 is described with reference to FIGS. 3 to 8.

Figure 3:
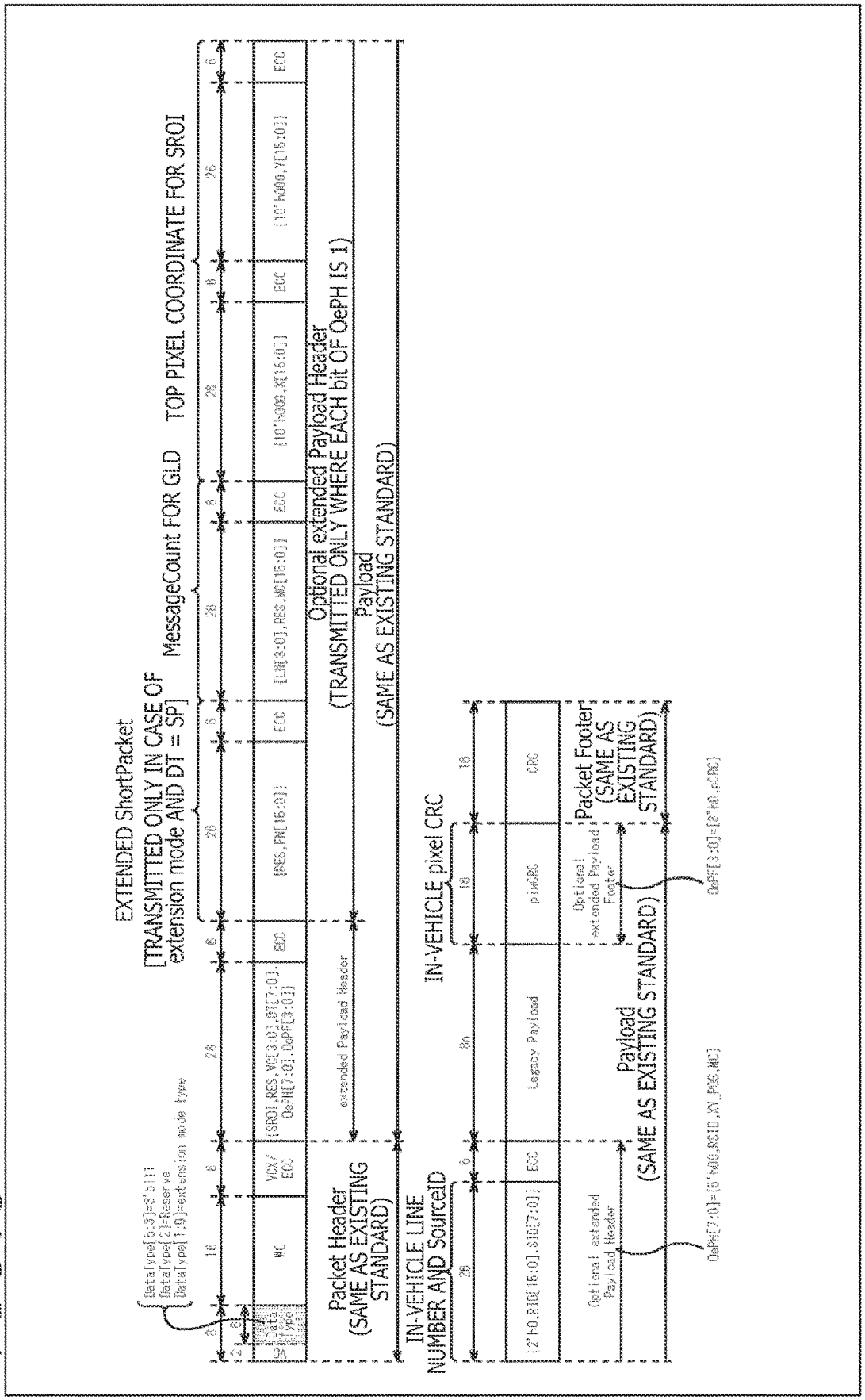
FIG. 3 is a view depicting a first structure example of an entire packet structure of an extended packet for the D-PHY.

FIG. 3 depicts an entire packet structure of a packet used in an extension mode of CSI-2 in the case where the physical layer is the D-PHY (the packet is hereafter referred to as an extended packet for the D-PHY).

As depicted in FIG. 3, the extended packet for the D-PHY has a packet structure in which the packet header and the packet footer are same as those in the existing CSI-2 standard. For example, in the packet header, a VC (VirtualChannel) indicative of the number of lines for a virtual channel, a data type (DataType) indicative of a type of data, a WC (Word Count) indicative of a data length of the payload, and VCX/ECC are placed. On the other hand, in the packet footer, a CRC (Cyclic Redundancy Check) is placed.

Here, in the existing CSI-2 standard, the data type to be transmitted by the packet header is defined as "reserve" at 0x38 to 0x3F. Therefore, in the extended packet for the D-PHY, setting information for identifying the extension mode on the reception side is newly defined by using the data type defined as "reserve" in the existing CSI-2 standard.

For example, as the data type,
in the case of DataType[5:3]=3'b111, the extension mode
DataType[2]=Reserve (RES: reservation for extension in the future)·
DataType[1:0]=extension mode type (four extension modes are prepared) are defined.

In particular, among 0x38 to 0x3F for the data type defined as "reserve" in the existing CSI-2 standard, for example, DataType[5:3] is defined as extension mode setting information, and DataType[1:0] is defined as extension type setting information. The extension mode setting information indicates whether or not the extension mode is applied, and, for example, in the case where DataType[5:3] is 3'b111, it is indicated that the extension mode is applied. Further, in the case where four types, that is, an extension mode 0, an extension mode 1, an extension mode 2, and an extension mode 3, are prepared as the type of the extension mode, the extension type setting information indicates which of these types the extension mode is. For example, in the case where DataType[1:0] is 2'b00, this indicates that the type of the extension mode is the extension mode 0.

Further, in the extension mode 0 (DataType[1:0]=2'b00), for example, a packet structure in which the payload is split into four is defined. In particular, the payload in the extension mode 0 is split into an extended payload header (ePH: extended Payload Header), an optional extended payload header (OePH: Optional extended Payload Header), a legacy payload (Legacy Payload), and an optional extended payload footer (OePF: Optional extended Payload Footer) as depicted in FIG. 3.

The extended payload header is placed at the top corresponding to the payload of the existing CSI-2 standard, and in the extension mode, it is necessary to transmit the extended payload header without fail. For example, the extended payload header is configured from setting information including an identification flag of the SROI, an extended VC (VirtualChannel), extended DataType, a selection flag of the OePH, a selection flag of the OePF, or the like as depicted in FIG. 3. Here, by the extended VC, the VC that is configured from 4 bits in the existing CSI-2 standard is extended to 8 bits, and by the extended DataType, the DataType that is configured from 4 bits in the existing CSI-2 standard is extended to 8 bits.

For example, in a packet for the D-PHY, the VC of the existing packet header already exists in 4 bits, and by defining the extended VC of the extended payload header with 4 bits, totaling 8 bits are used. In particular, OePH[7:0]={5'h00, RSID, XY POS, MC} and OePF[3:0]={3'h0, pCRC} can be defined, and ON/OFF of packet transmission necessary for each use can be controlled.

The optional extended payload header and the optional extended payload footer are selectively transmitted according to a use.

The legacy payload corresponds to a payload same as that of the existing CSI-2 standard.

By setting the extended payload header, optional extended payload header, and optional extended payload footer as necessary in such a manner, data suitable for various uses can be transmitted. Further, data to be transmitted by the extended payload header, optional extended payload header, and optional extended payload footer is assumed to be an ECC (Error Correction Code) of 26 bits+6 bits. By this, it is possible to divert a circuit for an existing payload header to suppress increase of the circuit scale and achieve improvement of the error tolerance.

Figure 4:
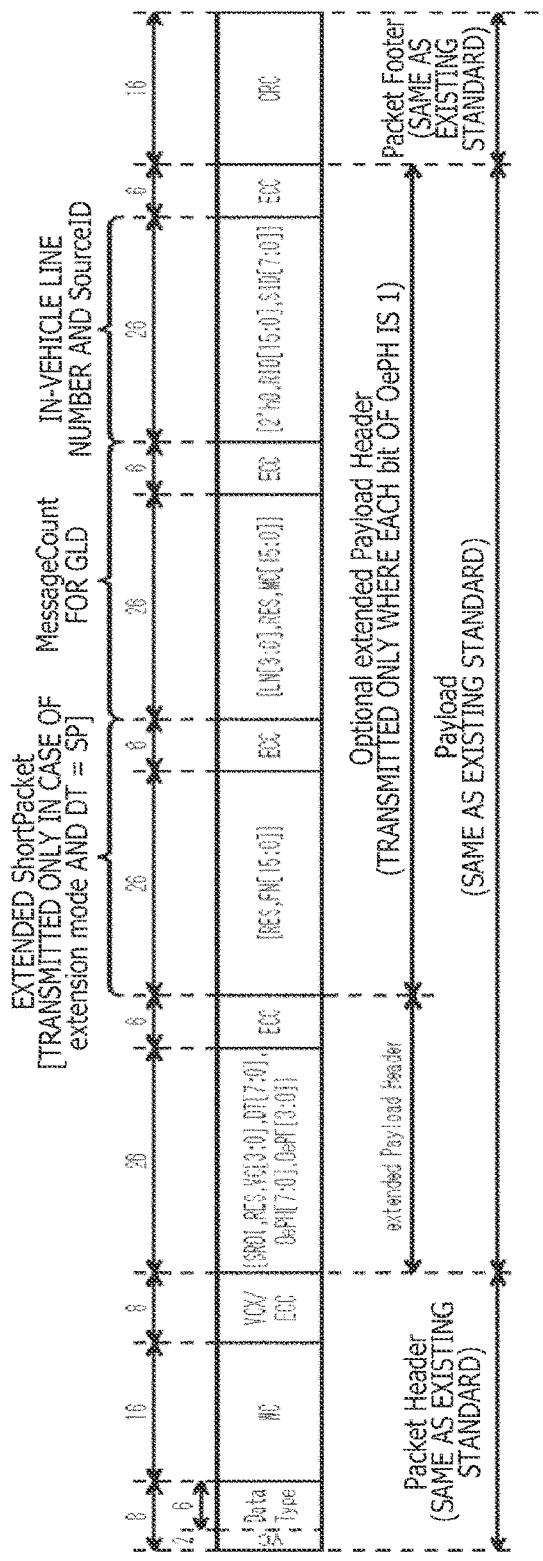
FIG. 4 is a view depicting a first structure example of a packet structure of an extended short packet for the D-PHY.

As a particular example of application of such an extended packet for the D-PHY as described above, a packet structure of a short packet used in the extension mode of CSI-2 in the case where the physical layer is the D-PHY (such short packet is hereinafter referred to as an extended short packet for the D-PHY) is depicted in FIG. 4. Similarly, in FIG. 5, there is depicted a packet structure of a long packet used in the extension mode of CSI-2 in the case where the physical layer is the D-PHY (such long packet is hereinafter referred to as an extended long packet for the D-PHY).

In such an extended short packet for the D-PHY as depicted in FIG. 4, the extension type setting information of the data type placed in the packet header indicates that the type of the extension mode is the extension mode 0 (DT[5:0]=0x1C (5'b111_0_0)). Further, the short packet setting information of the data type placed in the extended payload header indicates that the packet is a short packet (DT[7:0] =0x00 (Frame Start Code (Short Packet))).

In the case where the extension mode is used and the data type placed in the extended payload header is DT[7:0]=0x00 to 0x0F in such a manner, the packet is the extended short packet, and data including the Short Packet Data Field for the extended short packet is transmitted to the optional extended payload header without fail. This Short Packet Data Field is same as that defined in the existing CSI-2 standard.

It is to be noted that, upon transmission of an extended short packet, although the MC (MessageCount for GLD) and the RSID (in-vehicle line number and SourceID) included in the optional extended payload header may be transmitted, since the legacy payload and the pCRC are unnecessary, their transmission is inhibited. If they are transmitted in error, then they are ignored on the reception side.

An extended short packet having such a packet structure as depicted in FIG. 4 can be extended in regard to the data bit width of the data type and the virtual channel in comparison with an extended short packet in compliance with the existing CSI-2 standard and can deal with various uses defined by the optional extended payload header. Further, in the case where such functions are unnecessary, an extended short packet in compliance with the existing CSI-2 standard may be transmitted together with an extended long packet.

Figure 5:
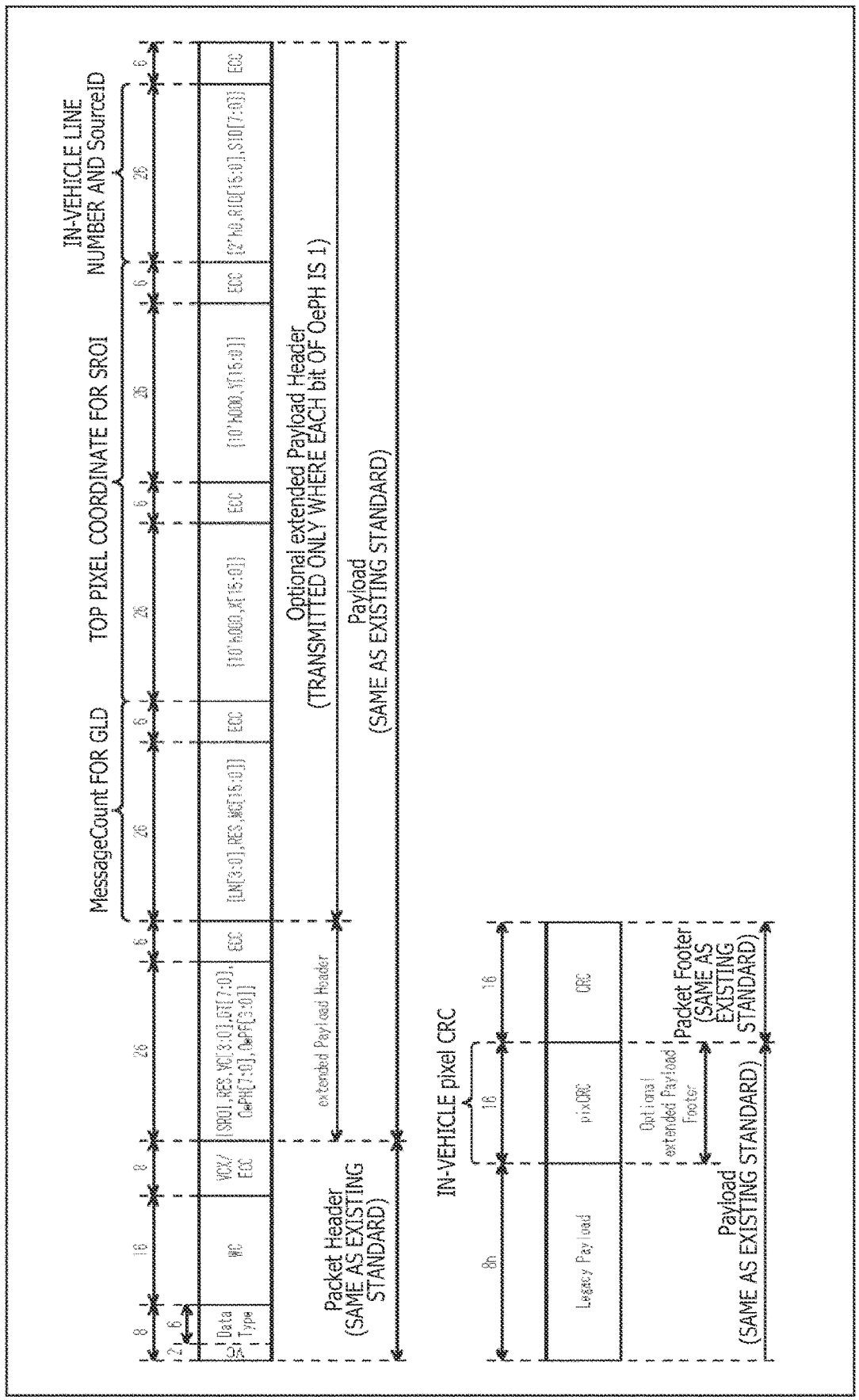
FIG. 5 is a view depicting a first structure example of a packet structure of an extended long packet for the D-PHY.

In such an extended long packet for the D-PHY as depicted in FIG. 5, the extension type setting information for a data type placed in the packet header indicates that the type of the extension mode is the extension mode 0 (DT[5:0] =0x1C (5'b111_0_0)). Further, the short packet setting information for a data type placed in the extended payload header indicates that the packet is not the short packet but other packets (DT[7:0] is not 0x00 to 0x0F but the other (=extended Long Packet)). Accordingly, by the extended long packet, data including the Short Packet Data Field is not transmitted.

Further, according to the setting of the extended payload header, the optional extended payload header, legacy payload, and optional extended payload footer are placed in and transmitted together with the payload in the existing CSI-2 standard. Since they are placed in and transmitted together with the existing payload in such a manner, they are recognized by the existing SerDes transmission circuit 34 and SerDes reception circuit 35 (FIG. 2), similarly to image data transmitted by the existing payload, and are transmitted as they are to a succeeding stage.

Then, the application processor 22 in the last stage can decide that the extension mode is used, on the basis of the data type DT[5:0] of the packet header. Accordingly, the application processor 22 can interpret the content of the payload in order from the extended payload header to extract data of the desired extension mode.

Figure 6:
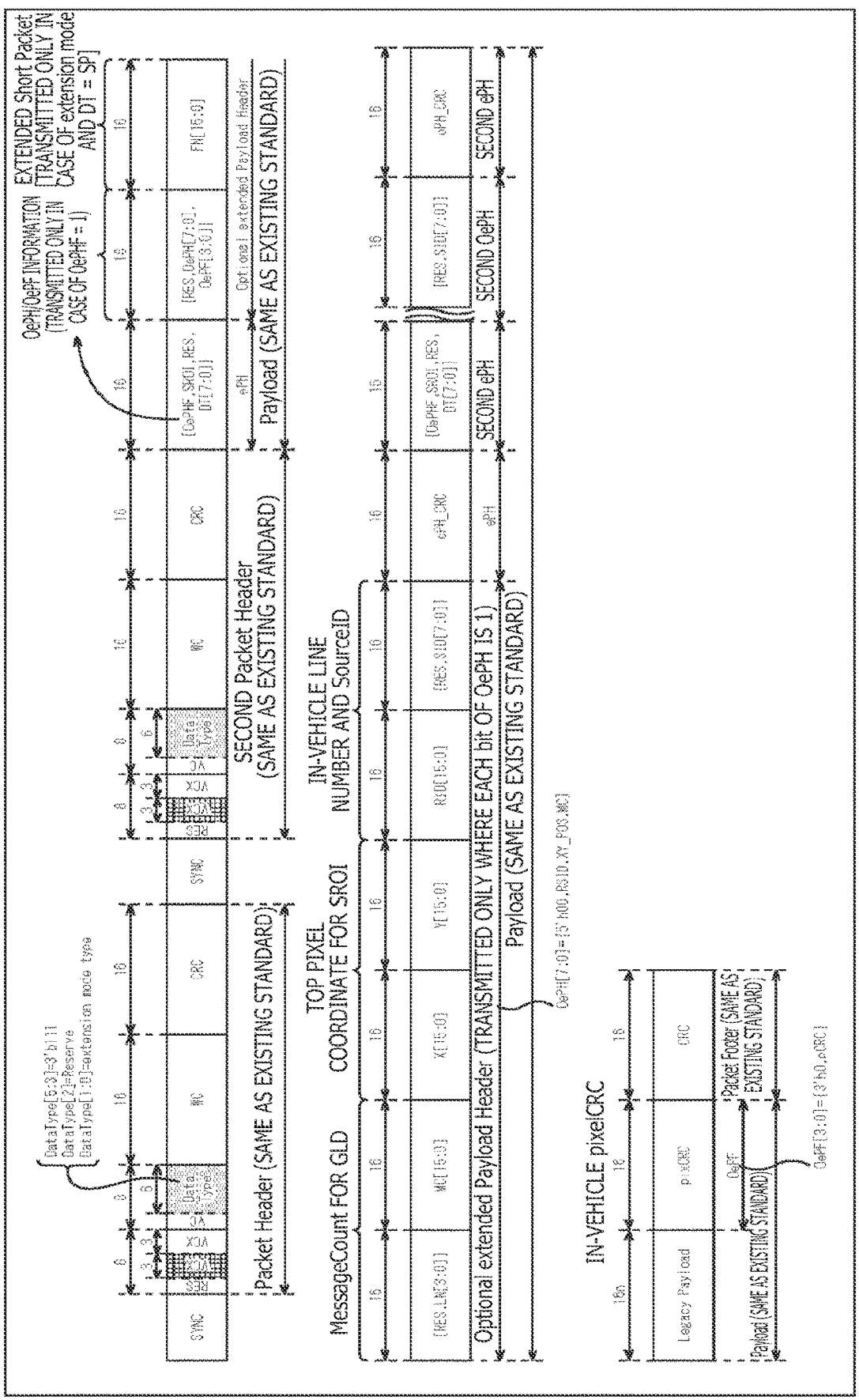
FIG. 6 is a view depicting a first structure example of an entire packet structure of an extended packet for the C-PHY.

FIG. 6 depicts an entire packet structure of a packet used in the extension mode of CSI-2 in the case where the physical layer is the C-PHY (the packet is hereafter referred to as an extended packet for the C-PHY). It is to be noted that description of a configuration of the extended packet for the C-PHY depicted in FIG. 6 which is common to the extended packet for the D-PHY depicted in FIG. 3 is omitted, and only a different configuration is described.

For example, in the extended packet for the C-PHY, the extension mode is identified from the data type, and all data according to each application to be executed by the application processor 22 is embedded in and transmitted together with the payload, similarly to the extended packet for the D-PHY of FIG. 3.

As depicted in FIG. 6, in the case of the extended packet for the C-PHY, the packet header is transmitted twice similarly to the case of the packet for the C-PHY in compliance with the existing CSI-2 standard, and because the C-PHY converts 16 bits into seven symbols, data is arranged in a unit of 16 bits. Further, the extended payload header is placed at the top of the payload. However, as for a virtual channel, in the case of the C-PHY, since the top of the existing packet header is defined as Reserve due to this, the virtual channel is not placed in the extended payload header. Needless to say, a virtual channel may be placed in the extended payload header, similarly to the extended packet for the D-PHY.

Further, since the number of bits of the optional extended payload header and the optional extended payload footer is great, a flag OePHF is prepared, and in the case where this flag is 1, OePH/OePF information is transmitted next. Then, after the ePH information and OePH information, a CRC is transmitted as the extended payload header, and a packet header configured similarly is transmitted repeatedly twice. By using a mechanism and a structure same as the existing mechanism and structure by which a packet header is transmitted twice, both circuit reusability and error tolerance can be achieved.

As a particular example of application of such an extended packet for the C-PHY as described above, FIG. 7 depicts a packet structure of a short packet to be used in the extension mode of CSI-2 in the case where the physical layer is the C-PHY (such short packet is hereinafter referred to as an extended short packet for the C-PHY). Similarly, FIG. 8 depicts a packet structure of a long packet to be used in the extension mode of CSI-2 in the case where the physical layer is the C-PHY (such long packet is hereinafter referred to as an extended long packet for the C-PHY).

Figure 7:
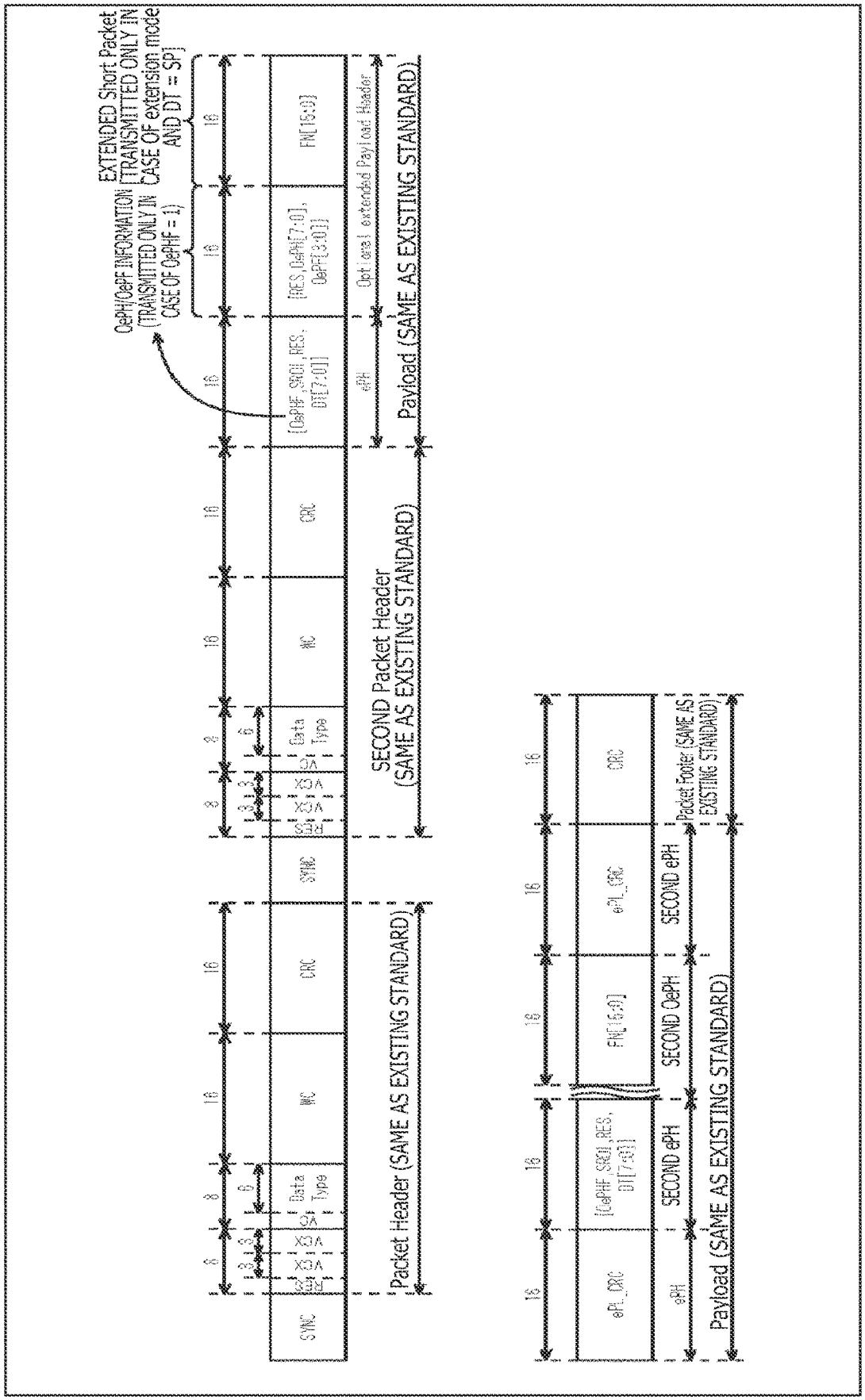
FIG. 7 is a view depicting a first structure example of a packet structure of an extended short packet for the C-PHY.
Figure 8:
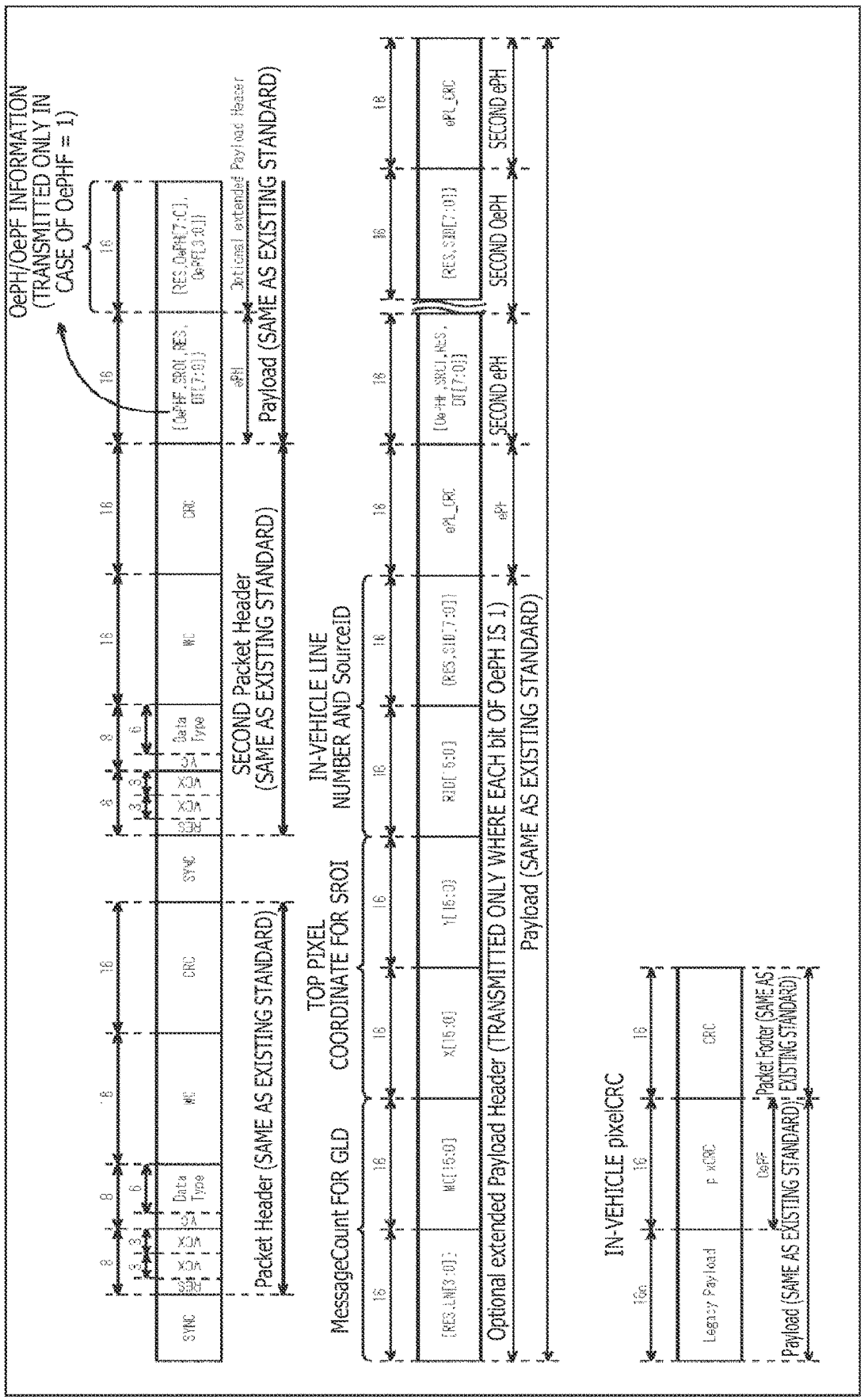
FIG. 8 is a view depicting a first structure example of a packet structure of an extended long packet for the C-PHY.

It is to be noted that the extended short packet for the C-PHY depicted in FIG. 7 is not much different in packet structure from the extended short packet for D-PHY depicted in FIG. 4 and that the extended long packet for the C-PHY depicted in FIG. 8 is not much different in packet structure from the extended long packet for D-PHY depicted in FIG. 5.

<Example of Configuration of Image Sensor and Application Processor>

Figure 9:
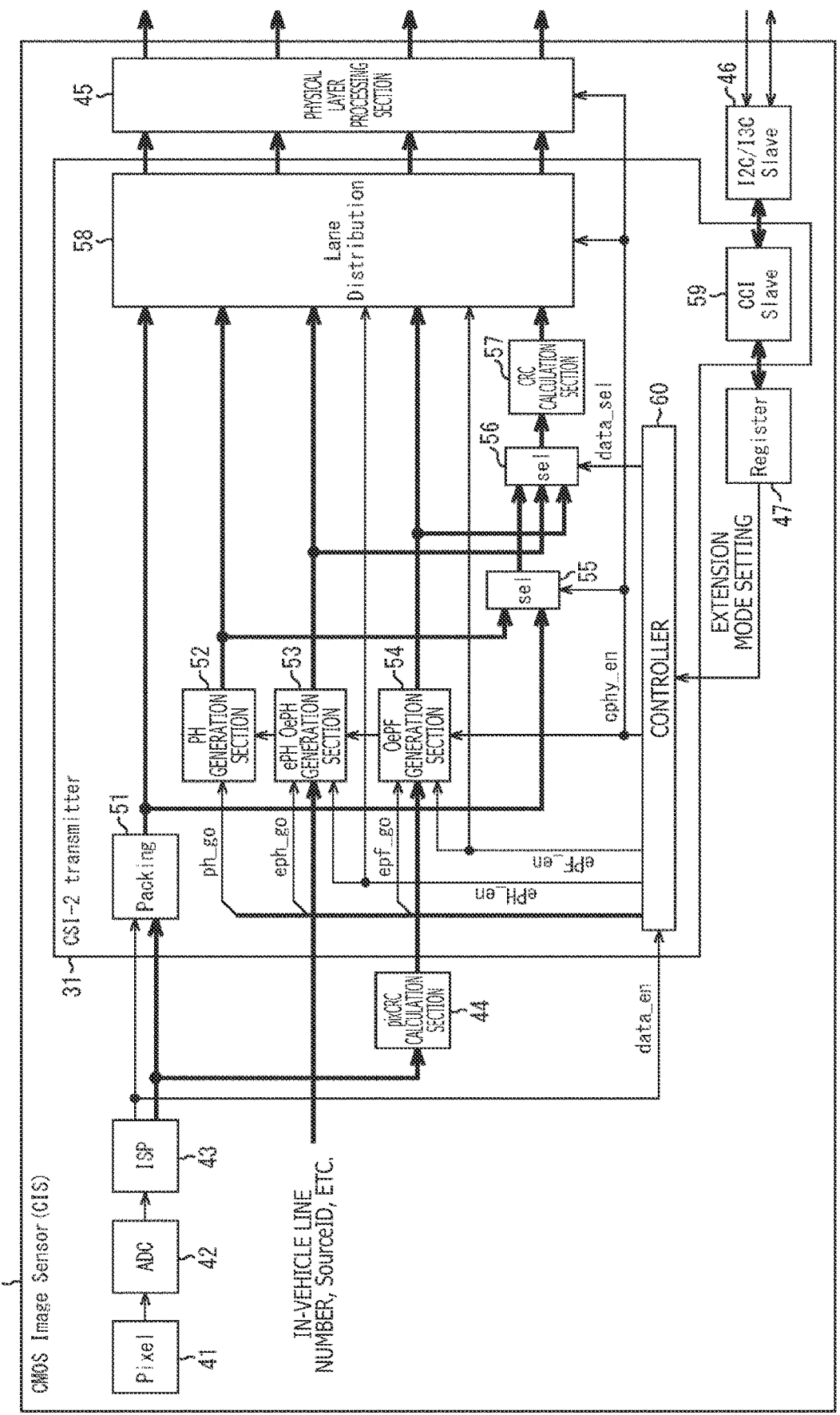
FIG. 9 is a block diagram depicting an example of a configuration of an image sensor.

FIG. 9 is a block diagram depicting an example of a configuration of the image sensor 21 that includes the extension mode compatible CSI-2 transmission circuit 31.

As depicted in FIG. 9, the image sensor 21 includes, in addition to the extension mode compatible CSI-2 transmission circuit 31, a pixel 41, an AD converter 42, an image processing section 43, a pixel CRC calculation section 44, a physical layer processing section 45, an I2C/I3C slave 46, and a register 47. Further, the extension mode compatible CSI-2 transmission circuit 31 includes a packing section 51, a packet header generation section 52, a payload header generation section 53, a payload footer generation section 54, selection sections 55 and 56, a CRC calculation section 57, a lane distribution section 58, a CCI slave 59, and a controller 60.

The pixel 41 outputs an analog pixel signal according to a light amount of received light, and the AD converter (ADC: Analog-to-Digital Converter) 42 digitally converts the pixel signal outputted from the pixel 41 and supplies the digital pixel signal to the image processing section 43. The image processing section (ISP: Image Signal Processor) 43 supplies image data obtained by carrying out various image processes for the image based on the pixel signal, to the pixel CRC calculation section 44 and the packing section 51. Further, the image processing section 43 supplies a data enable signal data_en indicative of whether or not image data is valid, to the packing section 51 and the controller 60.

The pixel CRC calculation section 44 calculates the CRC for each pixel in image data supplied from the image processing section 43 and supplies the CRC to the payload footer generation section 54.

The physical layer processing section 45 can execute a physical layer process for both the C-PHY and the D-PHY. For example, the physical layer processing section 45 executes a physical layer process for the C-PHY in the case where a C layer enable signal cphy_en supplied from the controller 60 is valid, while the physical layer processing section 45 executes a physical layer process for the D-PHY in the case where the C layer enable signal cphy_en is invalid. Then, the physical layer processing section 45 supplies packets divided into four lanes by the lane distribution section 58, to the application processor 22.

The I2C/I3C slave 46 performs communication according to the initiative of an I2C/I3C master 72 (FIG. 10) of the application processor 22, on the basis of the standard of I2C (Inter-Integrated Circuit) or I3C (Improved Inter Integrated Circuits).

Into the register 47, various settings transmitted from the application processor 22 are written through the I2C/I3C slave 46 and the CCI slave 59. Here, as the settings to be written into the register 47, for example, settings according to the CSI-2 standard, extension mode settings indicative of whether or not the extension mode is used, fixed communication settings necessary for communication in the extension mode, and so forth are available.

The packing section 51 performs a packing process of placing image data supplied from the image processing section 43 into the payload of a packet and supplies the payload to the selection section 55 and the lane distribution section 58.

If an instruction for generation of a packet header is received according to a packet header generation instruction signal ph_go supplied from the controller 60, the packet header generation section 52 generates a packet header and supplies the packet header to the selection section 55 and the lane distribution section 58.

In particular, according to the existing CSI-2 standard, the packet header generation section 52 generates a packet header in which setting information indicative of conditions set for data to be transmitted by a packet, such as a data type indicative of a type of the data, is placed. Further, the packet header generation section 52 places extension mode setting information indicative of whether or not the current mode is the extension mode that uses an extended header, into the unused region defined as a region that is not used in the existing CSI-2 standard with respect to the data type that is setting information indicative of a type of data to be transmitted by the packet. Further, the packet header generation section 52 places extension type setting information indicating which of a plurality of types of the extension mode prepared as the extension mode is used for the extension mode, into the unused region.

The payload header generation section 53 generates an extended payload header and an optional extended payload header according to an extended payload header generation instruction signal eph_go and an extended payload header enable signal ePH_en supplied from the controller 60, respectively, and supplies them to the selection section 56 and the lane distribution section 58. Further, to the payload header generation section 53, an in-vehicle line number, a source ID (identification), and so forth are supplied according to a use of the image sensor 21, and they are placed into the extended payload header or the optional extended payload header, as needed.

In other words, the payload header generation section 53 generates an extended payload header into which, for example, such setting information as depicted in FIG. 3 is to be placed separately from a packet header generated by the packet header generation section 52. Further, in the case where the optional extended header is to be transmitted, the payload header generation section 53 places optional extended header setting information indicating that an optional extended header is to be transmitted, into the extended header as the optional extended header setting information (OePH[7:0]) indicative of whether or not an optional extended header is to be transmitted, and generates an optional extended header following the extended header.

The payload footer generation section 54 generates an optional extended payload footer according to an extended payload footer generation instruction signal epf_go and an extended payload header enable signal ePF-en supplied from the controller 60 and supplies the optional extended payload footer to the selection section 56 and the lane distribution section 58.

In particular, in the case where the packet to be transmitted in the extension mode is an extended long packet in which data to be transmitted as the payload is placed in the existing CSI-2 standard, the payload footer generation section 54 generates an optional extended footer that is to be placed following the legacy payload into which data is to be placed.

Further, to the packet header generation section 52, payload header generation section 53, and payload footer generation section 54, a C layer enable signal cphy_en is supplied from the controller 60. Then, in the case where the C layer enable signal cphy_en indicates valid, the packet header generation section 52 generates a packet header for the C-PHY, and the payload header generation section 53 generates an extended payload header and an optional extended payload header for the C-PHY while the payload footer generation section 54 generates an optional extended payload footer for the C-PHY. On the other hand, in the case where the C layer enable signal cphy_en indicates invalid, the packet header generation section 52 generates a packet header for the D-PHY, and the payload header generation section 53 generates an extended payload header and an optional extended payload header for the D-PHY while the payload footer generation section 54 generates an optional extended payload footer for the D-PHY.

In the case where the C layer enable signal cphy_en is valid, the selection section 55 selects, according to the C layer enable signal cphy_en supplied from the controller 60, a packet header supplied from the packet header generation section 52 and supplies the packet header to the selection section 56. On the other hand, in the case where the C layer enable signal cphy_en is invalid, the selection section 55 selects a payload supplied from the packing section 51 and supplies the payload to the selection section 56.

According to a data selection signal data_sel supplied from the controller 60, the selection section 56 selects and supplies, to the CRC calculation section 57, any of a packet header or a payload selectively supplied through the selection section 55, an extended payload header and an optional extended payload header supplied from the payload header generation section 53, or an optional extended payload footer supplied from the payload footer generation section 54.

The CRC calculation section 57 obtains, by arithmetic operation, a CRC of a packet header, a payload, an extended payload header, an optional extended payload header, or an optional extended payload footer selectively supplied thereto through the selection section 56 and supplies the CRC to the lane distribution section 58.

Under the control of the controller 60, the lane distribution section 58 distributes a payload supplied from the packing section 51, a packet header supplied from the packet header generation section 52, an extended payload header and an optional extended payload header supplied from the payload header generation section 53, an optional extended payload footer supplied from the payload footer generation section 54, and a CRC supplied from the CRC calculation section 57, into four lanes in compliance with the CSI-2 standard, and supplies them in the four lanes to the physical layer processing section 45.

The CCI (Camera Control Interface) slave 59 performs communication according to the initiative of a CCI master 88 (FIG. 10) of the application processor 22, on the basis of the CSI-2 standard.

The controller 60 reads out various settings stored in the register 47 and performs control of the blocks configuring the extension mode compatible CSI-2 transmission circuit 31, according to the settings. For example, the controller 60 controls switching between transmission of a packet having a packet structure in compliance with the existing CSI-2 standard and transmission of a packet having a packet structure in the extension mode, according to the content of data of a transmission target.

The image sensor 21 is configured in such a manner as described above and can generate an extended packet having such a packet structure as described hereinabove with reference to FIGS. 3 to 8, thereby transmitting the extended packet to the application processor 22.

Figure 10:
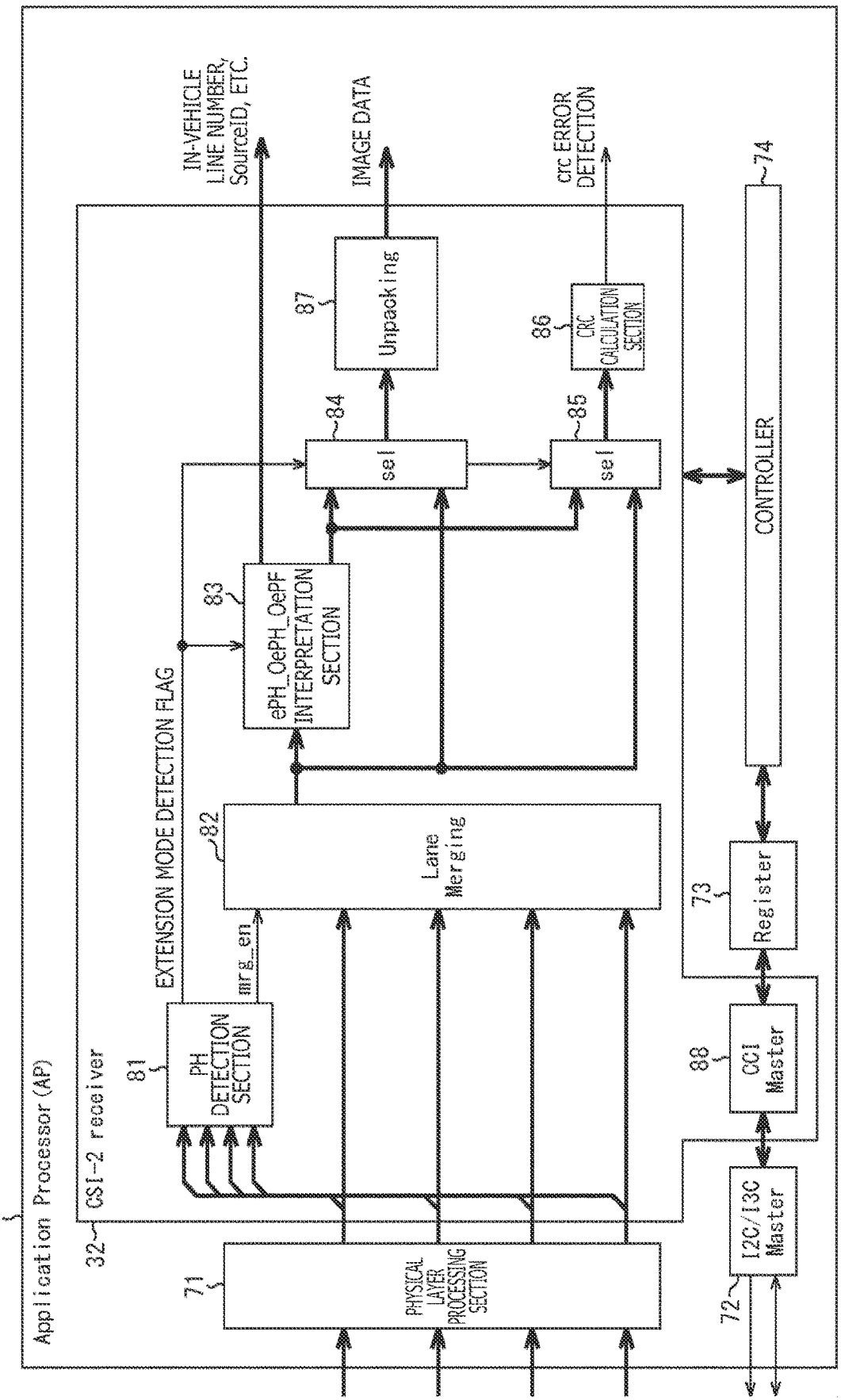
FIG. 10 is a block diagram depicting an example of a configuration of an application processor.

FIG. 10 is a block diagram depicting an example of a configuration of the application processor 22 that includes the extension mode compatible CSI-2 reception circuit 32.

As depicted in FIG. 10, the application processor 22 includes a physical layer processing section 71, the I2C/I3C master 72, a register 73, and a controller 74, in addition to the extension mode compatible CSI-2 reception circuit 32. Further, the extension mode compatible CSI-2 reception circuit 32 includes a packet header detection section 81, a lane merging section 82, an interpretation section 83, selection sections 84 and 85, a CRC calculation section 86, an unpacking section 87, and the CCI master 88.

The physical layer processing section 71 can execute a physical layer process for both the C-PHY and the D-PHY. As described above, the physical layer processing section 45 of the image sensor 21 performs a physical layer process for either the C-PHY or the D-PHY, and the physical layer processing section 71 executes a physical layer process same as that executed by the physical layer processing section 45.

The I2C/I3C master 72 performs communication with the I2C/I3C slave 46 (FIG. 9) of the image sensor 21 according to the initiative thereof, on the basis of the I2C or I3C standard.

Into the register 73, various settings to be written into the register 47 of the image sensor 21 are recorded by the controller 74.

The controller 74 performs control of the respective blocks configuring the application processor 22.

The packet header detection section 81 detects a packet header from a packet supplied from the physical layer processing section 71 and checks a data type placed in the packet header. Regarding the data type of the packet header, in the case where the extension mode setting information indicates the extension mode (DataType[5:3]=3'b111), the packet header detection section 81 then supplies an extension mode detection flag indicative of the extension mode to the interpretation section 83, selection section 84, and selection section 85. Further, the packet header detection section 81 supplies a merge enable signal mrg_en indicative of whether or not merge of the divided four lanes is to be made valid, to the lane merging section 82 on the basis of the packet header.

In particular, the packet header detection section 81 detects a packet header in which setting information (data type and so forth) indicative of conditions set for data to be transmitted by a packet is placed, according to the existing CSI-2 standard. At this time, the packet header detection section 81 outputs an extension mode detection flag according to extension mode setting information that indicates whether or not the extension mode using an extended header is used and that is placed in the unused region defined as a region not used in the existing CSI-2 standard with respect to the data type that is setting information indicative of a type of data to be transmitted by a packet. Thus, switching between reception of a packet having a packet structure in compliance with the existing CSI-2 standard and reception of a packet having a packet structure in the extension mode is performed. Further, according to the extension mode type information placed in the unused region of the data type defined as a region that is not used in the existing CSI-2 standard, the packet header detection section 81 recognizes which of a plurality of types of the extension mode prepared as the extension mode is used for the extension mode.

In the case where the merge enable signal mrg_en supplied from the packet header detection section 81 is valid, the lane merging section 82 merges the packets divided into the four lanes and supplied from the physical layer processing section 71. Then, the lane merging section 82 supplies the packet of one lane to the interpretation section 83, selection section 84, and selection section 85.

In the case where the extension mode detection flag supplied from the packet header detection section 81 indicates the extension mode, the interpretation section 83 reads out the extended payload header, optional extended payload header, and optional extended payload footer from the packet supplied from the lane merging section 82, on the basis of the packet structure of the extension mode. Then, the interpretation section 83 interprets setting information placed in the extended payload header, optional extended payload header, and optional extended payload footer.

In particular, the interpretation section 83 receives the extended payload header placed at the top of the payload in compliance with the existing CSI-2 standard, as the extended header, and interprets setting information placed in the extended payload header. Further, in the case where the optional extended header setting information placed in the extended header indicates transmission of an optional extended header that is to be transmitted selectively according to a use, the interpretation section 83 receives the optional extended header following the extended header and interprets setting information placed in the optional extended header. Further, in the case where the packet to be transmitted in the extension mode is an extended long packet in which data to be transmitted as the payload in the existing CSI-2 standard is placed, the interpretation section 83 receives the optional extended footer placed following the legacy payload in which data is placed, and interprets the optional extended footer.

Then, the interpretation section 83 reads out, for example, an in-vehicle line number, a source ID, and so forth placed in the optional extended payload header and outputs them to an LSI (not depicted) in the following stage.

It is to be noted that, in the case where the extension mode detection flag supplied form the packet header detection section 81 does not indicate the extension mode, that is, in the case where a packet having an existing packet structure is supplied, the interpretation section 83 stops without performing such processes as described above.

The selection section 84 selectively supplies data to the unpacking section 87 on the basis of the packet structure of an existing packet or the packet structure of the extended packet, according to an extension mode detection flag supplied form the packet header detection section 81.

The selection section 85 selectively supplies data to the CRC calculation section 86 on the basis of the packet structure of an existing packet or the packet structure of the extended packet, according to an extension mode detection flag supplied form the packet header detection section 81.

The CRC calculation section 86 arithmetically operates a CRC of a packet header, payload, extended payload header, optional extended payload header, or optional extended payload footer selectively supplied through the selection section 85. Then, in the case where a CRC error is detected, the CRC calculation section 86 outputs a crc error detection signal indicative of this to the LSI (not depicted) in the following stage.

The unpacking section 87 performs an unpacking process of extracting image data placed in the payload selectively supplied through the selection section 84 and outputs acquired image data to the LSI (not depicted) in the following stage.

The CCI master 88 performs communication with the CCI slave 59 (FIG. 9) of the image sensor 21 according to the initiative thereof, on the basis of the CSI-2 standard.

The application processor 22 is configured in such a manner as described above. The application processor 22 can receive an extended packet transmitted from the image sensor 21 and interpret setting information placed in the extended payload header, optional extended payload header, and optional extended payload footer to acquire image data.

<Communication Process>

A communication process performed by the image sensor 21 and the application processor 22 is described with reference to FIGS. 11 to 14.

Figure 11:
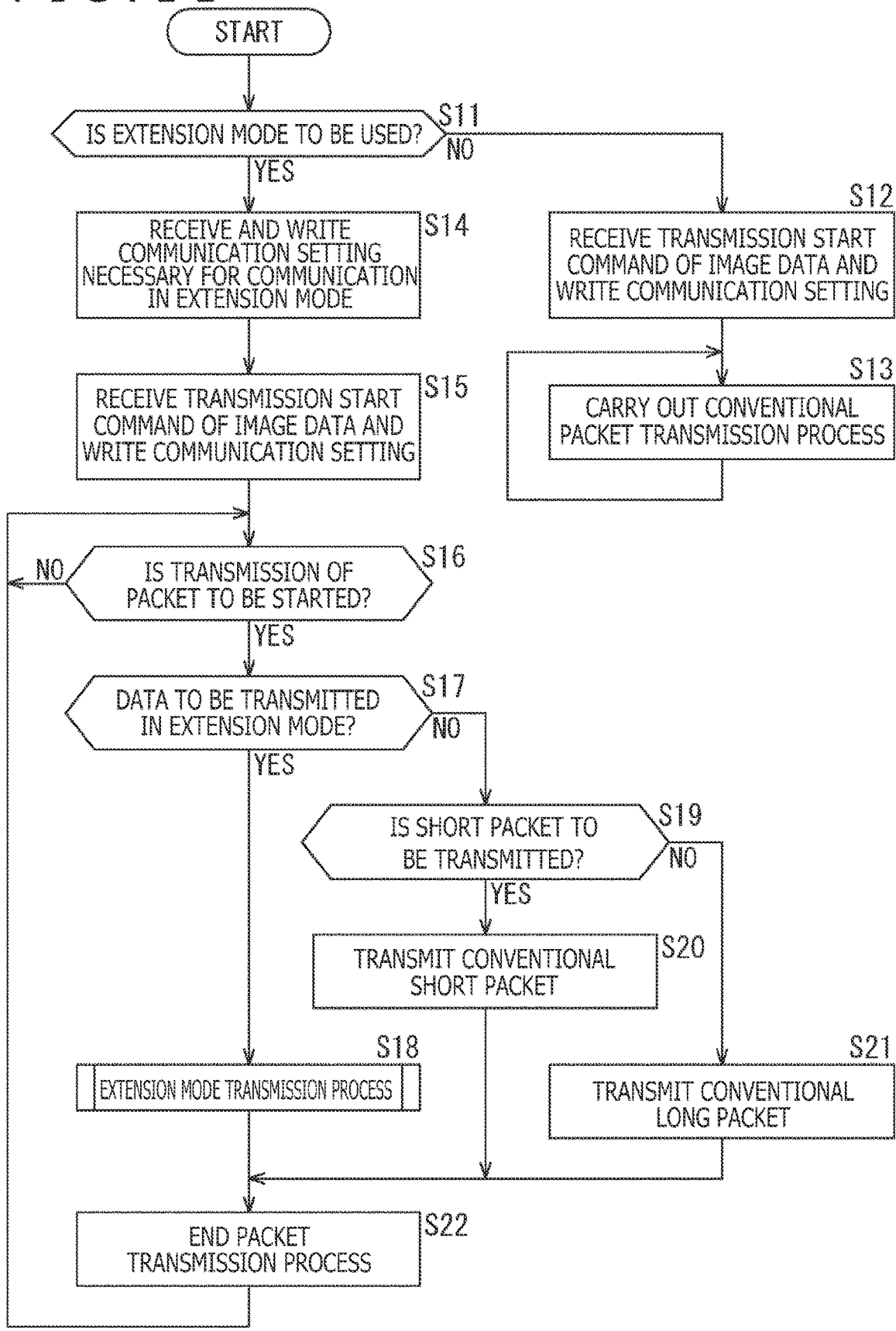
FIG. 11 is a flow chart illustrating a process in which the image sensor transmits a packet.

FIG. 11 is a flow chart illustrating a process in which the image sensor 21 transmits a packet.

For example, if the image sensor 21 is connected to the application processor 22 through the bus 23, then processing is started. In step S11, the controller 60 decides whether or not an extension mode is to be used when to start communication with the application processor 22. For example, the controller 60 confirms the extension mode setting stored in the register 47 and decides, in the case where an extension mode setting indicating that the extension mode is to be used is written by the application processor 22, that the extension mode is to be used.

In the case where the controller 60 decides in step S11 that the extension mode is not to be used, the processing advances to step S12.

In step S12, the I2C/I3C slave 46 receives a transmission starting command of image data transmitted from the application processor 22 (in step S54 of FIG. 13 described later). Further, the I2C/I3C slave 46 receives a communication setting in compliance with the CSI-2 standard transmitted together with the transmission starting command and writes the communication setting into the register 47 through the CCI slave 59.

In step S13, the image sensor 21 executes a conventional packet transmission process of transmitting a packet having a packet structure in compliance with the existing CSI-2 standard to the application processor 22, on the basis of the communication setting stored in the register 47.

On the other hand, in the case where the controller 60 decides in step S11 that the extension mode is to be used, the processing advances to step S14.

In step S14, the I2C/I3C slave 46 receives a fixed communication setting necessary for communication in the extension mode (for example, a copy for each lane of PH/PF at the time of GLD, and so forth) and writes the communication setting into the register 47 through the CCI slave 59.

In step S15, the I2C/I3C slave 46 receives a transmission starting command of image data transmitted from the application processor 22 (in step S57 of FIG. 13 described later). Further, the I2C/I3C slave 46 receives a communication setting in compliance with the CSI-2 standard transmitted together with the transmission starting command and writes the communication setting into the register 47 through the CCI slave 59.

In step S16, the controller 60 decides whether or not transmission of a packet is to be started, and waits the processing until it is decided that transmission of a packet is to be started.

Then, in the case where it is decided in step S16 that transmission of a packet is to be started, the processing advances to step S17, and the controller 60 decides whether or not the data is to be transmitted in the extension mode. Here, according to the content of the data of a transmission target, in the case where the data is such data as is transmitted, for example, in a use case of an example of application described later, the controller 60 decides that the data is data to be transmitted in the extension mode.

In the case where the controller 60 decides in step S17 that the data is data to be transmitted in the extension mode, the processing advances to step S18, and an extension mode transmission process (refer to FIG. 12) of transmitting an extended packet ready for the extension mode is performed.

On the other hand, in the case where the controller 60 decides in step S17 that the data is not data to be transmitted in the extension mode, the processing advances to step S19.

In step S19, the controller 60 decides whether or not a short packet is to be transmitted. For example, at the time of start of a frame and at the time of end of the frame, the controller 60 decides that a short packet is to be transmitted.

In the case where the controller 60 decides in step S19 that a short packet is to be transmitted, the processing advances to step S20. In step S20, the packet header generation section 52 generates a packet header and transmits a short packet having the conventional packet structure to the application processor 22.

On the other hand, in the case where the controller 60 decides in step S19 that a short packet is not to be transmitted (that is, a long packet is to be transmitted), the processing advances to step S21. In step S21, the packing section 51 places the image data into the payload, and the CRC calculation section 57 obtains a CRC to generate a long packet having the conventional packet structure and transmits the long packet to the application processor 22.

After the processing in step S18, step S20, or step S21, the processing advances to step S22, and the controller 60 ends the packet transmission process. Thereafter, the processing returns to step S16, and then, the processing for transmitting a packet is similarly performed repeatedly targeting a next packet.

Figure 12:
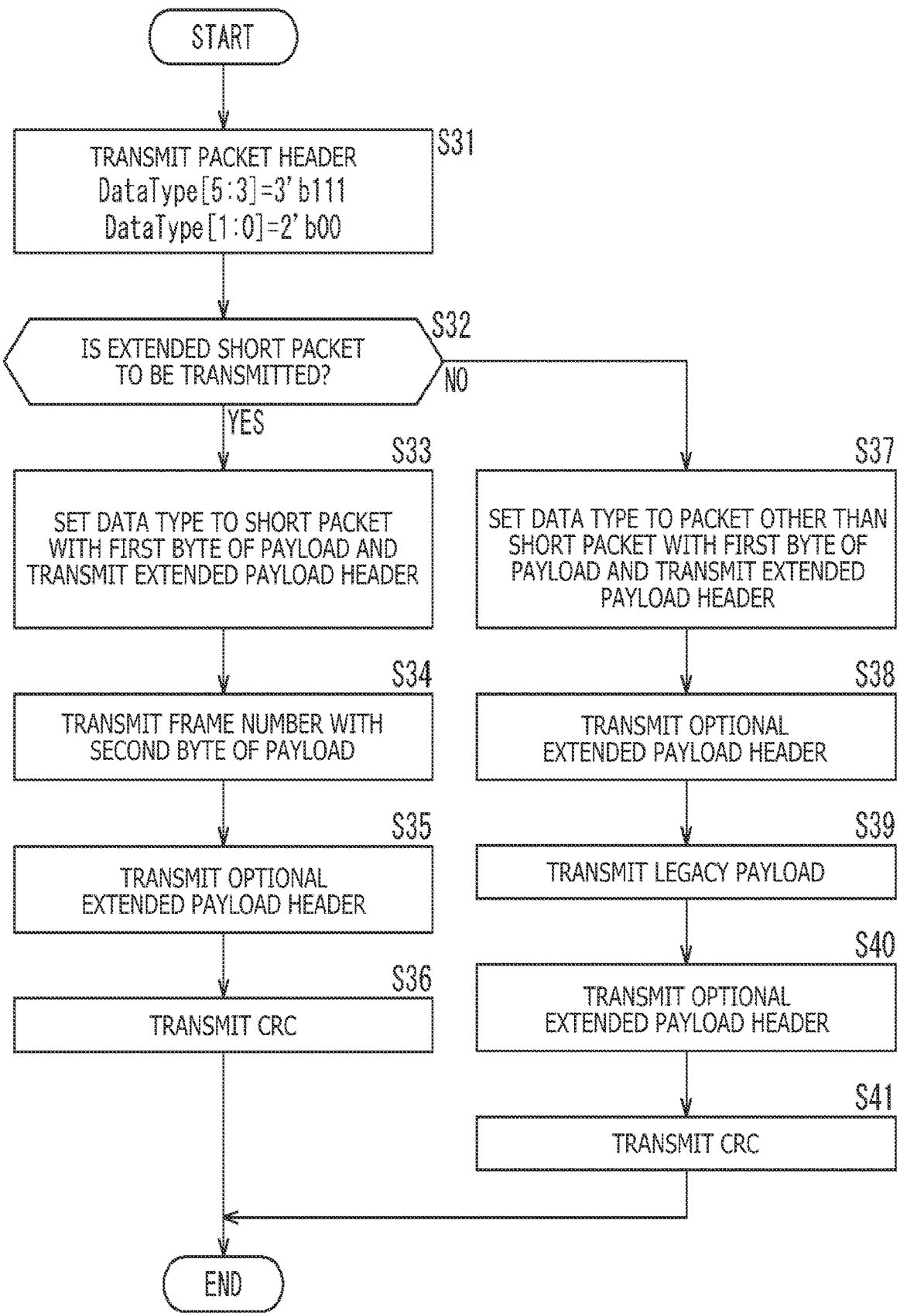
FIG. 12 is a flow chart illustrating an extension mode transmission process.

FIG. 12 is a flow chart illustrating an extension mode transmission process performed by the process in step S18 of FIG. 11.

In step S31, the packet header generation section 52 generates a packet header in which a VC, a data type, a WC, and so forth are placed, and transmits the packet header to the application processor 22. At this time, the packet header generation section 52 writes extension mode setting information indicating that the extension mode is used (DataType [5:3]=3'b111) and extension type setting information for identifying that the mode setting of the extension mode is the extension mode 0 (DataType[1:0]=2'b00), into the data type of the packet header.

In step S32, the application processor 22 decides whether or not an extended short packet is to be transmitted. For example, at the time of start of a frame and at the time of end of the frame, the controller 60 decides that an extended short packet is to be transmitted.

In the case where the application processor 22 decides in step S32 that an extended short packet is to be transmitted, the processing advances to step S33.

In step S33, the payload header generation section 53 transmits an extended payload header in which it is set at the first byte of the payload that the data type (DataType[7:0]) is the short packet. At this time, the payload header generation section 53 performs various settings to be placed into the extended payload header (for example, OePH[7:0], OePF[3:0], or the like).

In step S34, the payload header generation section 53 places a frame number (FN: FrameNumber) into the second byte of the payload and transmits the same.

In step S35, the payload header generation section 53 generates and transmits such an optional extended payload header as depicted in FIG. 4, according to the setting (OePH[7:0]) performed in step S33.

In step S36, the CRC calculation section 57 obtains a CRC and transmits the CRC as the packet footer.

On the other hand, in the case where the application processor 22 decides in step S32 that an extended short packet is not to be transmitted (that is, a long packet is to be transmitted), the processing advances to step S37.

In step S37, the payload header generation section 53 transmits the extended payload header in which the data type (DataType[7:0]) is set to a packet other than the short packet at the first byte of the payload. At this time, the payload header generation section 53 performs various settings to be placed into the extended payload header (for example, OePH[7:0], OePF[3:0], or the like).

In step S38, the payload header generation section 53 generates and transmits such an optional extended payload header as depicted in FIG. 5, according to the setting (OePH[7:0]) performed in step S37.

In step S39, the packing section 51 packs image data supplied from the image processing section 43 to generate a legacy payload and transmits the legacy payload.

In step S40, the payload footer generation section 54 generates and transmits such an optional extended payload footer as depicted in FIG. 4, according to the setting (OePF [3:0]) performed in step S37.

In step S41, the CRC calculation section 57 obtains a CRC and transmits the CRC as a packet footer.

Then, after the processing in step S36 or S41, the extension mode transmission process is ended.

The image sensor 21 can generate and transmit an extended short packet or an extended long packet in such a manner as described above.

Figure 13:
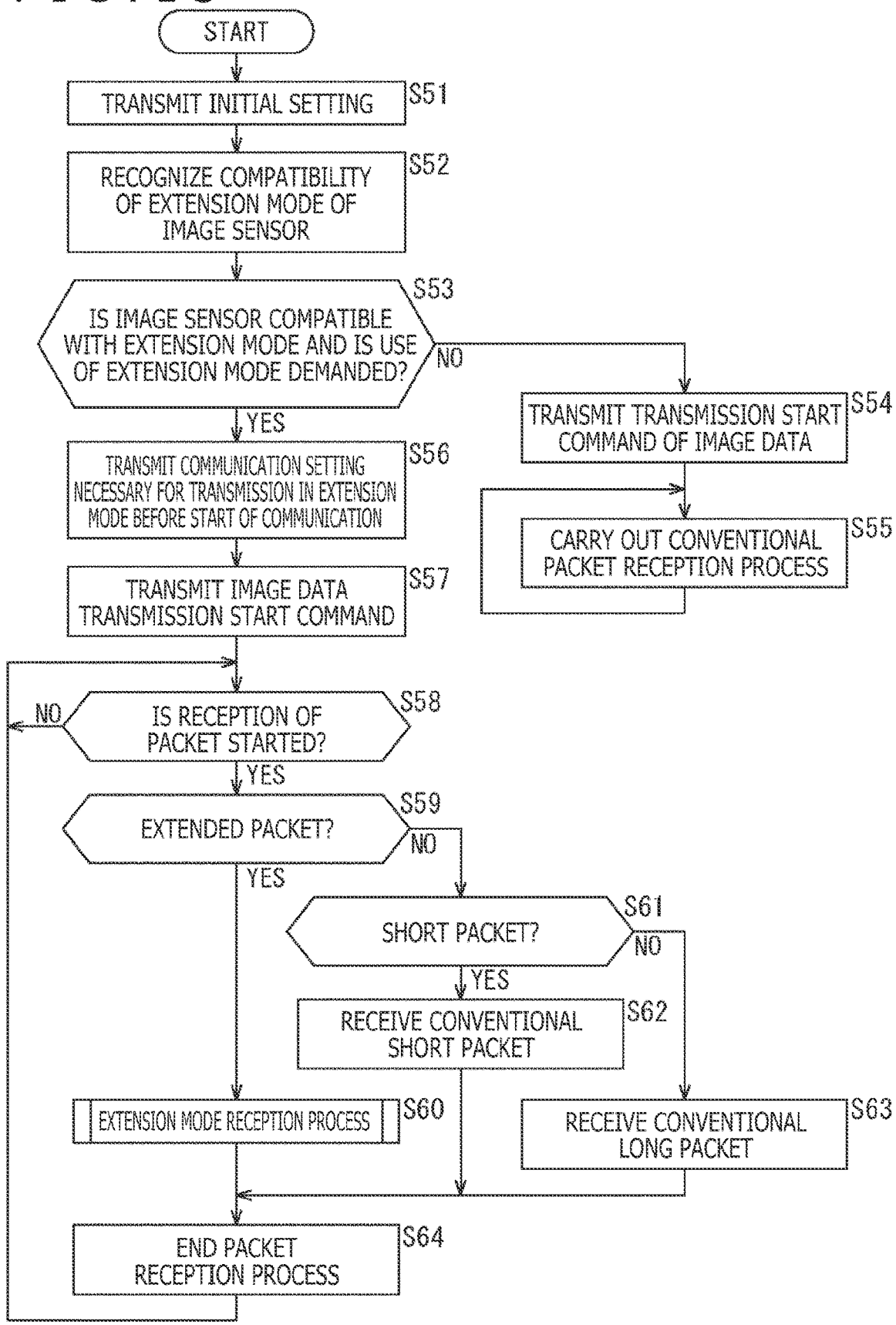
FIG. 13 is a flow chart illustrating a process in which the application processor receives a packet.

FIG. 13 is a flow chart illustrating a process in which the application processor 22 receives a packet.

For example, if the image sensor 21 is connected to the application processor 22 through the bus 23, then processing is started. In step S51, the controller 74 writes initial settings of the image sensor 21 (for example, whether the C-PHY or the D-PHY is to be used as the physical layer, and so forth) into the register 73 and transmits them to the image sensor 21 through the CCI master 88 by using the I2C/I3C master 72. Consequently, the initial settings are written into the register 47 of the image sensor 21.

In step S52, the controller 74 recognizes whether or not the image sensor 21 is compatible with the extension mode. For example, through acquiring a set value (for example, extended PH/PF compatible capability) stored in the register 47 of the image sensor 21 by using the I2C/I3C master 72, the controller 74 can recognize whether or not the image sensor 21 is compatible with the extension mode. Alternatively, the controller 74 can recognize in advance whether or not the image sensor 21 is compatible with the extension mode, for example, on the basis of an input by a manual operation or the like.

In step S53, the controller 74 decides whether or not the image sensor 21 is compatible with the extension mode and use of the extension mode is demanded by an application to be executed by the application processor 22.

In the case where the controller 74 decides in step S53 that the image sensor 21 is not compatible with the extension mode or that use of the extension mode is not demanded, the processing advances to step S54.

In step S54, the controller 74 transmits a transmission starting command of image data to the image sensor 21 by using the I2C/I3C master 72. At this time, the controller 74 also transmits communication settings in compliance with the CSI-2 standard.

In step S55, the application processor 22 performs a conventional packet reception process of receiving a packet having the packet structure according to the existing CSI-2 standard, on the basis of the communication settings transmitted in step S54.

On the other hand, in the case where the controller 74 decides in step S53 that the image sensor 21 is compatible with the extension mode and that use of the extension mode is demanded by the application to be executed by the application processor 22, the processing advances to step S56.

In step S56, the I2C/I3C master 72 transmits fixed communication settings necessary for communication in the extension mode before communication in the extension mode is started. Consequently, the fixed communication settings are written into the register 47 of the image sensor 21 (step S14 of FIG. 11).

In step S57, the controller 74 transmits a transmission starting command of image data to the image sensor 21 by using the I2C/I3C master 72. At this time, the controller 74 also causes the communication settings in compliance with the CSI-2 standard to be transmitted.

In step S58, the packet header detection section 81 confirms data supplied from the physical layer processing section 71 to decide whether or not reception of a packet is started, and waits its processing until it is decided that reception of a packet is started. For example, in the case where the packet header detection section 81 detects a packet header from data supplied from the physical layer processing section 71, the packet header detection section 81 decides that reception of a packet is started.

In the case where the packet header detection section 81 decides in step S58 that reception of a packet is started, the processing advances to step S59.

In step S59, the packet header detection section 81 confirms the data type of the packet header detected in step S58 and decides whether or not the packet whose reception is started is an extended packet compatible with the extension mode. For example, regarding the data type of the packet header, in the case where the extension mode setting information indicates the extension mode (DataType[5:3]=3'b111), the packet header detection section 81 decides that the packet whose reception is started is an extended packet.

In the case where the packet header detection section 81 decides in step S59 that the packet whose reception is started is an extended packet, the processing advances to step S60, and an extension mode reception process of receiving an extended packet (refer to FIG. 14) is performed.

On the other hand, in the case where the packet header detection section 81 decides in step S59 that the packet whose reception is started is not an extended packet, the processing advances to step S61.

In step S61, the packet header detection section 81 confirms the data type (DataType[5:0]) of the packet header detected in step S58 and decides whether or not the packet whose reception is started is a short packet.

In the case where the packet header detection section 81 decides in step S61 that the packet whose reception is started is a short packet, the processing advances to step S62. In step S62, the packet header detection section 81 receives a short packet having the conventional packet structure transmitted from the image sensor 21.

On the other hand, in the case where the packet header detection section 81 decides in step S61 that the packet whose reception is started is not a short packet (that is, reception of a long packet is started), the processing advances to step S63. In step S63, the unpacking section 87 receives the payload of a long packet having the conventional packet structure transmitted from the image sensor 21 and extracts image data, and the CRC calculation section 86 receives, as a CRC, the (WC+1)th byte transmitted following the packet header.

After the processing in step S60, step S62, or step S63, the processing advances to step S64, and the controller 74 ends the packet reception process. Thereafter, the processing returns to step S58, and thereafter, a process of receiving a packet is similarly performed repeatedly targeting a next packet.

Figure 14:
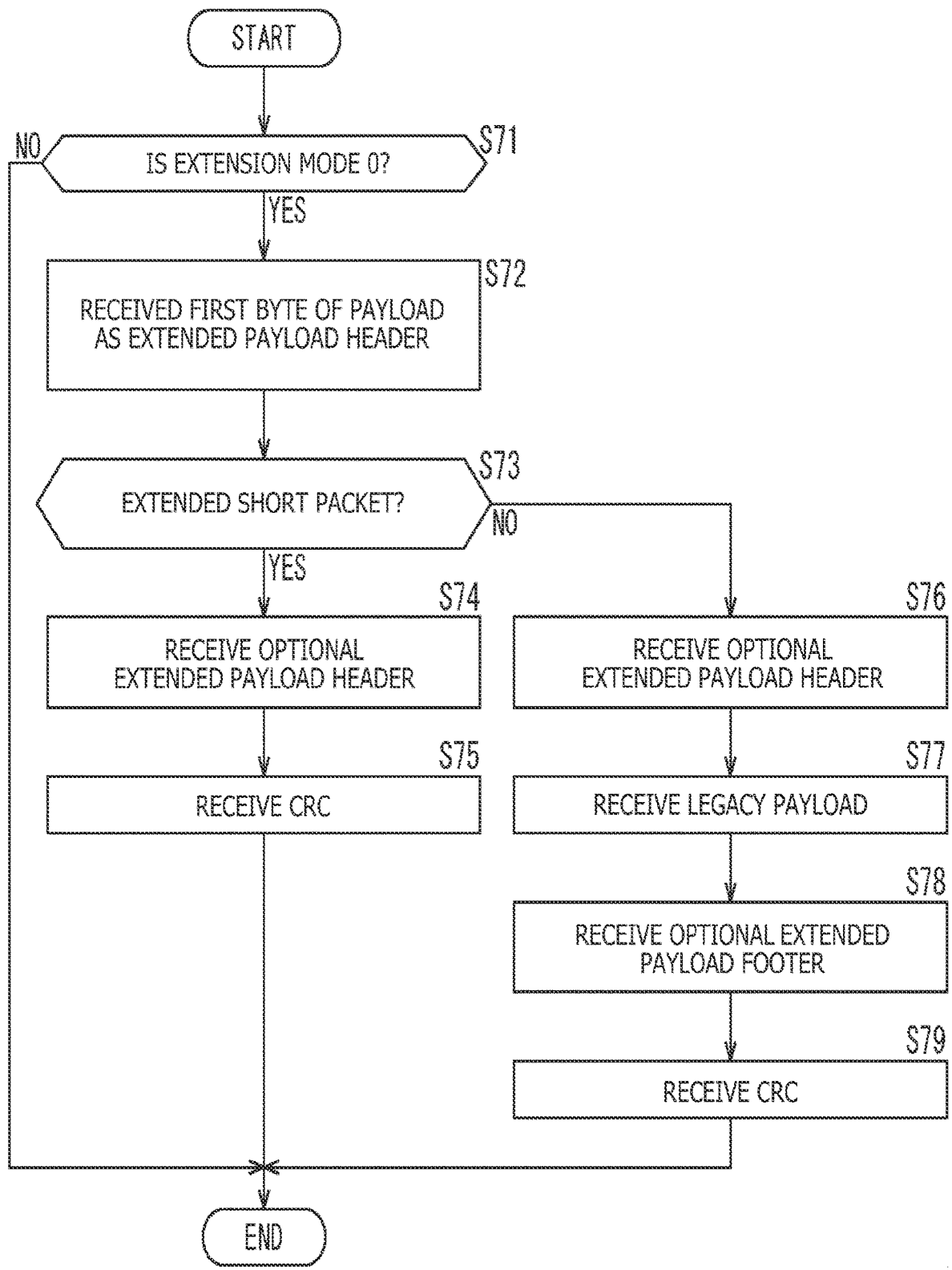
FIG. 14 is a flow chart illustrating an extension mode reception process.

FIG. 14 is a flow chart illustrating the extension mode reception process performed by the process in step S60 of FIG. 13.

In step S71, the packet header detection section 81 decides whether or not the mode setting of the extension mode is the extension mode 0. For example, regarding the data type of the packet header, in the case where the extension type setting information indicates the extension mode 0 (DataType[1:0]=2'b00), the packet header detection section 81 decides that the mode setting of the extension mode is the extension mode 0.

In the case where the packet header detection section 81 decides in step S71 that the mode setting of the extension mode is the extension mode 0, the processing advances to step S72. In step S72, the interpretation section 83 receives the first byte of the payload as the extended payload header.

In step S73, the interpretation section 83 confirms the data type (DataType[7:0]) of the extended payload header received in step S72 and decides whether or not the packet whose reception is started is an extended short packet.

In the case where the interpretation section 83 decides in step S73 that the packet whose reception is started is an extended short packet, the processing advances to step S74. In step S74, the interpretation section 83 receives an optional extended payload header according to the setting (OePH[7:0]) placed in the extended payload header received in step S72.

In step S75, the CRC calculation section 86 receives the (WC+1)th byte transmitted following the optional extended payload header, as a CRC.

On the other hand, in the case where the interpretation section 83 decides in step S73 that the packet whose reception is started is not an extended short packet (that is, reception of an extended long packet is started), the processing advances to step S76. In step S76, the interpretation section 83 receives an optional extended payload header according to the setting (OePH[7:0]) placed in the extended payload header received in step S72.

In step S77, the unpacking section 87 receives the legacy payload of the extended long packet transmitted from the image sensor 21 and extracts image data.

In step S78, the interpretation section 83 receives an optional extended payload footer according to the setting (OePF[3:0]) placed in the extended payload footer received in step S72.

In step S79, the CRC calculation section 86 receives the (WC+1)th byte transmitted following the optional extended payload footer, as a CRC.

Then, in the case where it is decided in step S71 that the mode setting of the extension mode is not the extension mode 0, after the processing in step S75, or after the processing in step S79, the extension mode reception process is ended.

The application processor 22 can receive an extended short packet or an extended long packet and acquire data in such a manner as described hereinabove.

<Second Structure Example of Packet Structure>

A second structure example of the packet structure of a packet used in communication between the extension mode compatible CSI-2 transmission circuit 31 and the extension mode compatible CSI-2 reception circuit 32 is described with reference to FIGS. 15 to 18.

In the first structure example depicted in FIGS. 3 to 8 described hereinabove, while emphasizing that the compatibility of the existing CSI-2 standard is maintained, the packet header and the packet footer are same as those of the packet structure of the existing CSI-2 standard, and extension of the packet structure is achieved by the extended payload header, optional extended payload header, and optional extended payload footer. In contrast, in the second structure example described below, the packet header and the packet footer are made different from those of the existing CSI-2 standard, and extension of the packet structure is achieved by the extended packet header and the extended packet footer.

Figure 15:
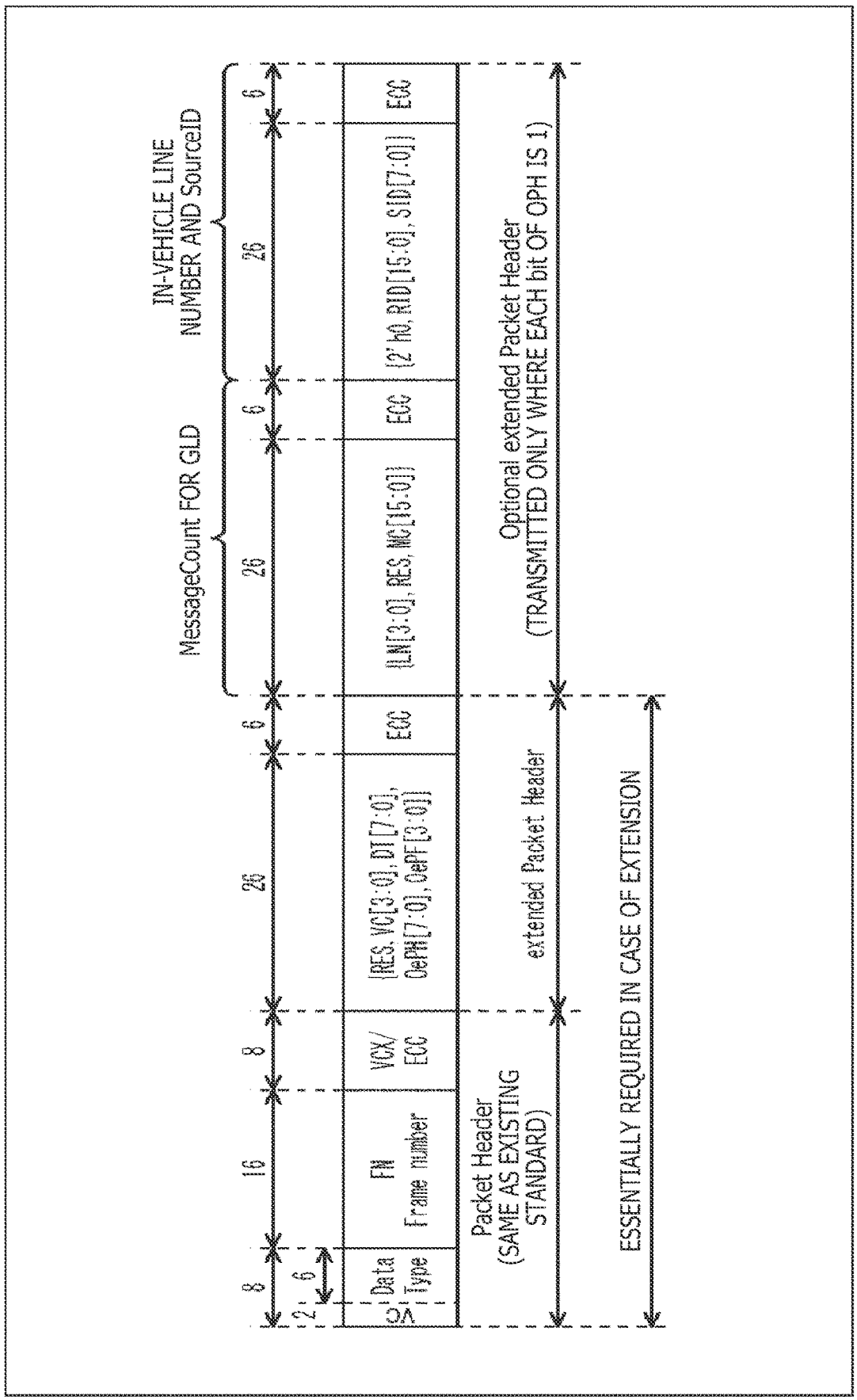
FIG. 15 is a view depicting a second structure example of an entire packet structure of an extended packet for the D-PHY.

FIG. 15 depicts a packet structure of a short packet used in the extension mode of CSI-2 in the case where the physical layer is the D-PHY (such short packet is hereinafter referred to as the extended short packet for the D-PHY).

According to the extended short packet for the D-PHY depicted in FIG. 15, the extension mode is identified from the data type placed in the packet header same as that of the existing CSI-2 standard, similarly to the case of the extended short packet for the D-PHY of the first structure example depicted in FIG. 4.

On the other hand, in the extended short packet for the D-PHY depicted in FIG. 15, a frame number is placed in the short packet data field of 16 bits next to the data type of the packet header, similarly to the case of the short packet in compliance with the existing CSI-2 standard. Then, following the packet header, an extended packet header configured similarly to the extended payload header depicted in FIG. 4 is transmitted.

Accordingly, the application processor 22 that is the reception side interprets the data type placed in the extended packet header and can decide, in the case where the data type is the extended short packet, that a frame number is placed in the data field of the packet header.

It is to be noted that the optional extended packet header of the extended short packet for the D-PHY depicted in FIG. 15 is configured similarly to the optional extended payload header of the extended short packet for the D-PHY of the first structure example depicted in FIG. 4. However, since the optional extended packet header has a packet structure in which the optional extended packet header is not embedded in the payload, there is no necessity to add a CRC to the last.

Figure 16:
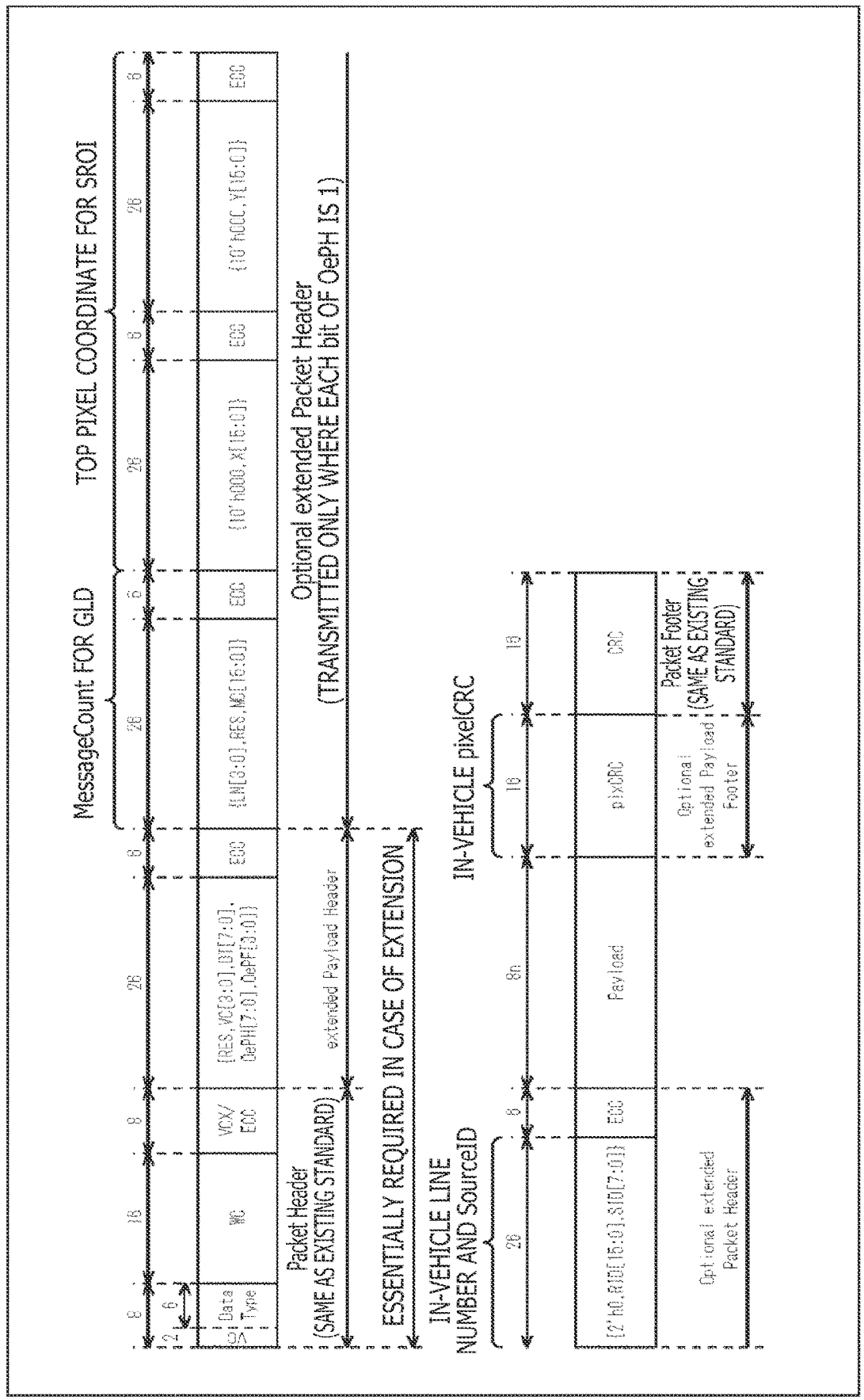
FIG. 16 is a view depicting a second structure example of a packet structure of an extended long packet for the D-PHY.

FIG. 16 depicts a packet structure of a long packet used in the extension mode of CSI-2 in the case where the physical layer is the D-PHY (such long packet is hereinafter referred to as the extended long packet for the D-PHY).

In the extended long packet for the D-PHY depicted in FIG. 16, extended data is not embedded in the payload but is transmitted as part of the packet header or the packet footer. Accordingly, the WC of the packet header at the top indicates the byte length of the payload, similarly to the existing standard.

Figure 17:
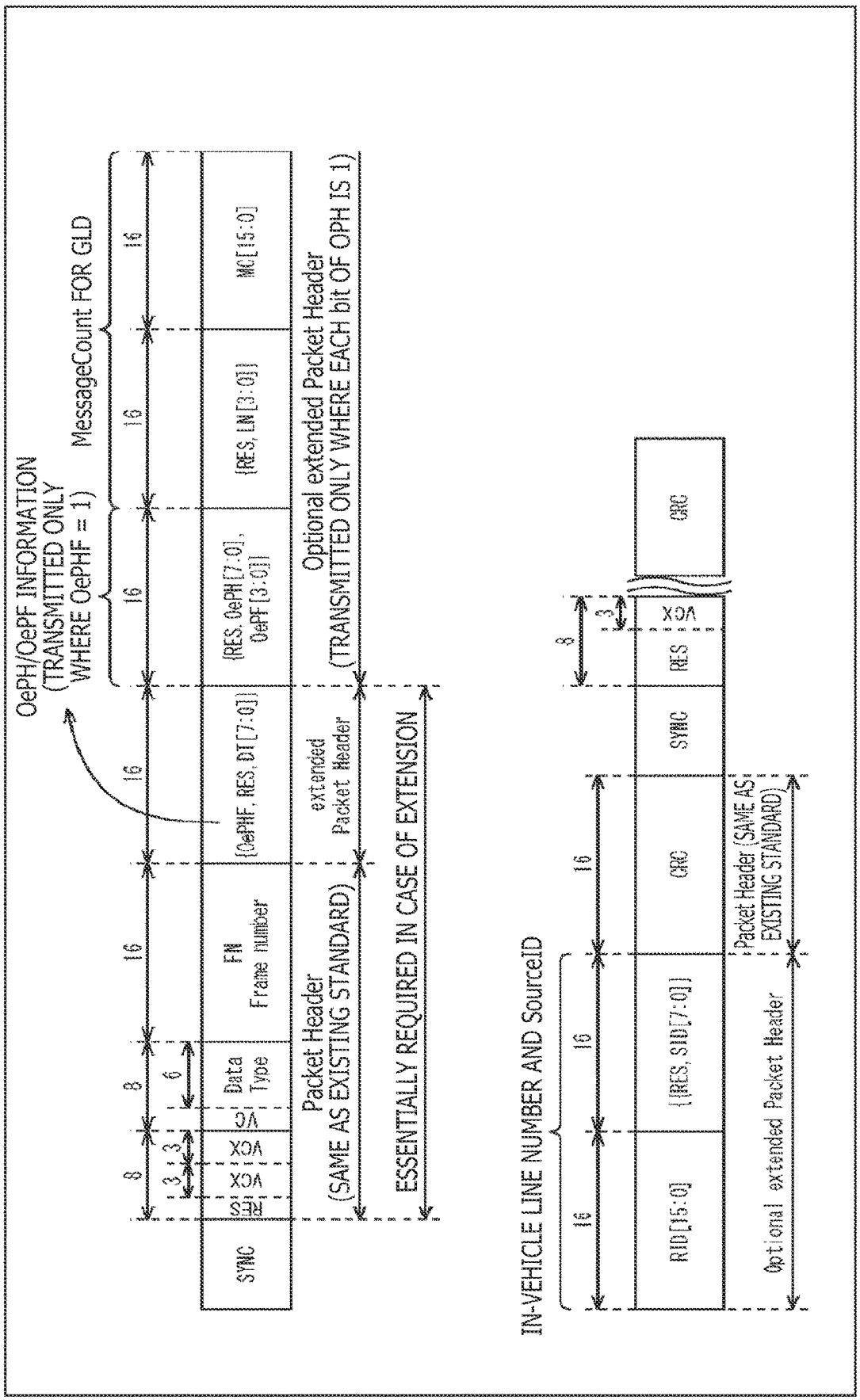
FIG. 17 is a view depicting a second structure example of a packet structure of an extended short packet for the C-PHY.

FIG. 17 depicts a packet structure of a short packet used in the extension mode of CSI-2 in the case where the physical layer is the C-PHY (such short packet is hereinafter referred to as the extended short packet for the C-PHY).

Since the extended portion of the extended short packet for the C-PHY depicted in FIG. 17 is transmitted as an extension of the packet header in compliance with the existing CSI-2 standard, the extended portion such as the extended payload header is inserted after the frame number. Further, the packet header ends with a CRC similarly to the existing CSI-2 standard. The packet structure in which they are transmitted twice with SYNC interposed therebetween is similar to that of the short packet in compliance with the existing CSI-2 standard.

Figure 18:
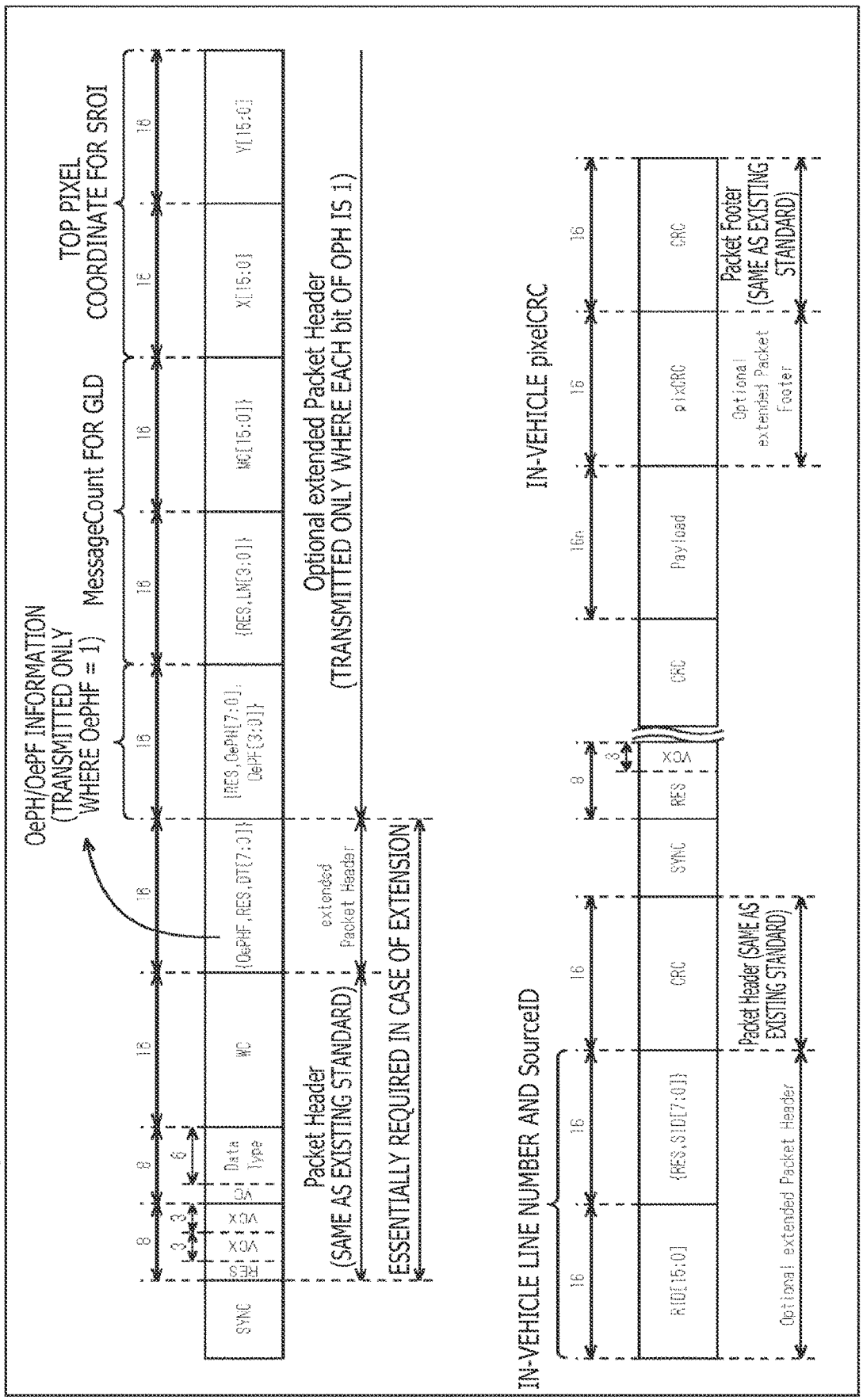
FIG. 18 is a view depicting a second structure example of a packet structure of an extended long packet for the C-PHY.

FIG. 18 depicts a packet structure of a long packet used in the extension mode of CSI-2 in the case where the physical layer is the C-PHY (such long packet is hereinafter referred to as the extended long packet for the C-PHY).

The extended long packet for the C-PHY depicted in FIG. 18 is different from the extended long packet for the C-PHY of the first structure example depicted in FIG. 8 in that the WC of the packet header at the top indicates a byte length of the payload, similarly to the existing standard.

With such a packet structure of the extended packet of the second structure example depicted in FIGS. 15 to 18 as described above, the extended packet can cope with a more variety of uses than a conventional art, similarly to the packet structure (FIGS. 3 to 8) of the extended packet of the first structure example.

However, the extended packet of the second structure example has the packet structure in which extended data is not embedded in the existing payload but the existing packet header or footer is extended. Therefore, in the case where the packet structure of the extended packet of the second structure example is adopted, an influence that, for example, may cause a change from a communication system used conventionally cannot be minimized in comparison with a case in which the packet structure of the extended packet of the first structure example is adopted. In other words, for example, a change for the existing SerDes transmission circuit 34 or SerDes reception circuit 35 (FIG. 2) is necessary.

As described above, by adopting the extended packet of the first structure example, it is possible to cope with a variety of uses such as an in-vehicle use, and such an influence that a change of a communication system used conventionally is necessary can be minimized to construct an in-vehicle system.

Further, by adopting the extended packet of the second structure example, although a change from a communication system used conventionally is necessary, it is possible to cope with a variety of uses such as an in-vehicle use.

<Modification of Image Sensor and Application Processor>

A modification of the image sensor and the application processor is described with reference to FIG. 19.

The respective blocks forming the image sensor 21 of FIG. 9 and the application processor 22 of FIG. 10 described hereinabove are configured so as to perform processing for both packets for the D-PHY and the C-PHY. In contrast, for example, blocks that perform processing exclusively for packets for the D-PHY and blocks that perform processing exclusively for packets for the C-PHY may both be provided such that processing is switched between them.

An image sensor 21A depicted in A of FIG. 19 includes a D layer processing block section 101, a C layer processing block section 102, a switching section 103, and the controller 60.

The D layer processing block section 101 includes, among the blocks configuring the image sensor 21 of FIG. 9, those blocks that perform processing exclusively for a packet for the D-PHY. The C layer processing block section 102 includes, among the blocks configuring the image sensor 21 of FIG. 9, those blocks that perform processing exclusively for a packet for the C-PHY. The switching section 103 performs switching under the control of the controller 60 such that a packet for the D-PHY generated by the D layer processing block section 101 is output in the case where the D-PHY is used for the physical layer and such that a packet for the C-PHY generated by the C layer processing block section 102 is output in the case where the C-PHY is used for the physical layer.

An application processor 22A depicted in B of FIG. 19 includes a switching section 111, a D layer processing block section 112, a C layer processing block section 113, and the controller 74.

The switching section 111 performs switching under the control of the controller 74 such that a packet transmitted from the image sensor 21A is supplied to either the D layer processing block section 112 or the C layer processing block section 113. The D layer processing block section 112 includes, among the blocks configuring the application processor 22 of FIG. 10, those blocks that perform processing exclusively for a packet for the D-PHY. The C layer processing block section 113 includes, among the blocks configuring the application processor 22 of FIG. 10, those blocks that perform processing exclusively for a packet for the C-PHY.

In the image sensor 21A and the application processor 22 configured in such a manner, before communication is started, a physical layer to be used can be set between the controller 60 and the controller 74. Then, for example, in the case where the D-PHY is used for the physical layer, a packet for the D-PHY generated by the D layer processing block section 101 is transmitted through the switching section 103 and supplied through the switching section 111 to the D layer processing block section 112 to be processed. On the other hand, for example, in the case where the C-PHY is used for the physical layer, a packet for the C-PHY generated by the C layer processing block section 102 is transmitted through the switching section 103 and supplied through the switching section 111 to the C layer processing block section 113 to be processed.

<Example of Application of Extended Packet>

It is examined to apply the extended packet described above, for example, to such use cases as described below.

For example, it is examined to apply the extended packet to such a use case that an image (RAW24) of a higher definition is transmitted.

For example, when image data is transmitted in the RAW form, RAW6, RAW7, RAW8, RAW10, RAW12, RAW14, RAW16, and RAW20 are defined as data types to be placed in the packet header in compliance with the existing CSI-2 standard. In contrast, in recent years, in order to cope with self-driving using an in-vehicle camera, transmission of an image of a higher definition is expected. Here, by applying the extended packet to increase the number of bits of the data type, it is possible to define, for the data type of the extended payload header, RAW24 of a higher definition.

Further, it is examined to apply the extended packet to SmartROI that is a technology for transmitting only a noticed image region on a screen image.

For example, nowadays, a large number of cameras are provided in a stadium or an airport. In the case where entire images captured by the cameras are transmitted from the cameras to a cloud server through a network such as the Internet, it is supposed that shortage in bandwidth of the Internet or increase of the calculation amount or the data amount on the cloud side occurs. Therefore, it is expected that, by cutting out only a noticed image region and transmitting the noticed image region on the edge (camera side), bandwidth shortage of the Internet or increase of the calculation amount or the data amount on the cloud side is suppressed.

In the case where such SROI is transmitted, in order to convey, to the reception side, which part in an entire image corresponds to the noticed image region, it is necessary to transmit the coordinates of the upper left corner of a rectangular region (ROI) together. Further, it is necessary to send data regarding the entire captured screen image at a predetermined timing according to a command from the reception side. Accordingly, data regarding the SROI image and data regarding the entire image (existing packet header) in a unit of a frame exist in a mixed manner, for example.

Thus, by applying the extended packet, it is possible to transmit coordinate data, for example, of 16 bits or more regarding each of the X coordinate and the Y coordinate.

Further, a use case is investigated to apply the extended packet to GLD in which, even if channel deterioration occurs, communication is continued by reducing the bandwidth or the number of lanes. It is to be noted that the GLD is a proposal examined in CSI-2 ver3.0.

For example, in self-driving, it is demanded that, even if part of cables connecting the cameras is broken at the time of collision, communication be continued by using a cable that is not broken such that the vehicle is stopped automatically after the vehicle takes refuge to the safety zone. Therefore, it is necessary for an in-vehicle camera interface to include at least a disconnection detection function, and information such as a row number (16 bits) indicating which row the information is on the screen image, SourceID (8 bits) indicating which camera sends the information, a message counter (16 bits) indicative of a transmission number, and so forth is required. Further, in the case of use in combination with such SROI as described above, it is conceivable that such information is transmitted in a unit of a frame.

Therefore, such information can be transmitted by applying the extended packet.

<Example of Configuration of Computer>

While the series of processes (communication method) described above can be executed by hardware, it can otherwise be executed by software. In the case where the series of processes is executed by software, a program that constructs the software is installed into a general-purpose computer or the like.

Figure 20:
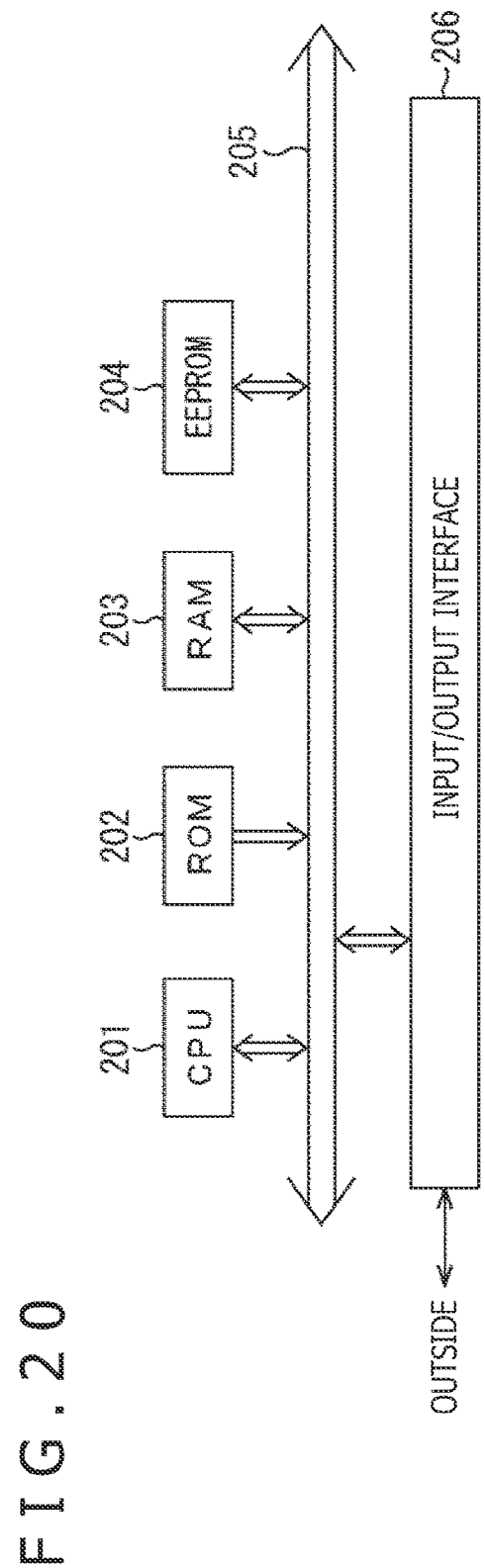
FIG. 20 is a block diagram depicting an example of a configuration of an embodiment of a computer to which the present technology is applied.

FIG. 20 is a block diagram depicting an example of a hardware configuration of a computer that executes the series of processes described hereinabove according to a program.

In the computer, a CPU (Central Processing Unit) 201, a ROM (Read Only Memory) 202, a RAM (Random Access Memory) 203, and an EEPROM (Electronically Erasable and Programmable Read Only Memory) 204 are connected to one another by a bus 205. Further, an input/output interface 206 is connected to the bus 205, and the input/output interface 206 is connected to the outside.

In the computer configured in such a manner as described above, the CPU 201 loads a program stored, for example, in the ROM 202 and the EEPROM 204, into the RAM 203 through the bus 205 and executes the program to perform the series of processes described above. Further, the program to be executed by the computer (CPU 201) can not only be written in the ROM 202 in advance but also be installed from the outside into the EEPROM 204 through the input/output interface 206 or updated.

Here, in the present specification, processes performed according to a program by a computer does not necessarily be performed in a time series according to an order described as a flow chart. In particular, the processes performed according to the program by the computer also include processes executed in parallel or individually (for example, processes by a parallel process or by an object).

Further, the program may be processed by a single computer (processor) or may be processed in a distributed manner by a plurality of computers. Further, the program may be transferred to and executed by a remote computer.

Further, in the present specification, the term "system" is used to signify an aggregation of a plurality of components (apparatuses, modules (parts), and so forth), and it does not matter whether or not all components are accommodated in the same housing. Accordingly, multiple apparatuses accommodated in separate housings and connected to each other through a network are a system, and one apparatus in which a plurality of modules is accommodated in a single housing is also a system.

Further, for example, the configuration described as one apparatus (or one processing section) may be divided so as to configure a plurality of apparatuses (or processing sections). Conversely, the configurations described as a plurality of apparatuses (or processing sections) in the foregoing description may be put together so as to configure a single apparatus (or processing section). Further, needless to say, a configuration not described hereinabove may be added to the configuration of each apparatus (or each processing section). Further, if a configuration or operation of an entire system is substantially same, then some of the components of a certain apparatus (or processing section) may be included in the configuration of another apparatus (or another processing section).

Further, for example, the present technology can take a configuration for cloud computing by which one function is shared and processed cooperatively by a plurality of apparatuses through a network.

Further, for example, the program described above can be executed by any apparatus. In this case, it is sufficient if the apparatus has necessary functions (functional blocks and so forth) and can obtain necessary information.

Further, for example, the respective steps of the flow charts described hereinabove can be executed by a single apparatus or can be shared and executed by a plurality of apparatuses. Further, in the case where a plurality of processes is included in one step, the plurality of processes included in the one step can be executed by one apparatus or may be shared and executed by a plurality of apparatuses. In other words, it is also possible to execute a plurality of processes included in one step as a process of a plurality of steps. Conversely, it is also possible to execute a process described as a plurality of steps collectively as one step.

It is to be noted that, in a program to be executed by a computer, processes of steps that describe the program may be executed in a time series in the order as described in the present specification or may be executed in parallel or executed individually at necessary timings such as when the process is called. In short, the processes in the respective steps may be executed in an order different from the order described hereinabove unless they do not give rise to a contradiction. Further, the processes at the steps that describe this program may be executed in parallel to processes of another program or may be executed in combination with processes of another program.

It is to be noted that a plurality of present technologies described in the present specification can be carried out alone and independently of each other unless they do not give rise to a contradiction. Needless to say, it is also possible to carry out a plurality of desirable present technologies together. For example, it is also possible to carry out part or the entirety of the present technology described in connection with any of the embodiments, in combination with part or the entirety of the present technology described in combination with another embodiment. It is also possible to carry out part or the entirety of the desirable present technology together with another technology that is not described hereinabove.

<Example of Combination of Configurations>

It is to be noted that the present technology can also take such configurations as described below.

(1)

A communication apparatus including:

a packet header generation section configured to place setting information indicative of a condition set for data to be transmitted in a packet to generate a packet header in compliance with an existing CSI-2 standard; and an extended header generation section configured to generate an extended header into which the setting information is to be placed separately from the packet header, in which the packet header generation section places, into an unused region defined as a region that is not used in the existing CSI-2 standard with respect to a data type that includes the setting information indicative of a type of the data to be transmitted in the packet, extension mode setting information indicative of whether or not an extension mode using the extended header is used.

(2)

The communication apparatus according to (1) above, in which the extended header generation section generates, as the extended header, an extended payload header that is arranged at a top of a payload in compliance with the existing CSI-2 standard.

(3)

The communication apparatus according to (1) above, in which the extended header generation section generates an extended packet header that is arranged following the packet header so as to extend a standard for the packet header, as the extended header.

(4)

The communication apparatus according to any one of (1) to (3) above, in which the extended header generation section places optional extended header setting information indicative of whether or not an optional extended header selectively transmitted according to a use is to be transmitted, into the extended header.

(5)

The communication apparatus according to any one of (1) to (4) above, in which, in the case where the optional extended header is to be transmitted, the extended header generation section places, into the extended header, the optional extended header setting information indicating that the optional extended header is to be transmitted, and generates the optional extended header following the extended header.

(6)

The communication apparatus according to any one of (1) to (5) above, in which the packet header generation section places extension type setting information indicating which of a plurality of types of the extension mode prepared as the extension mode is used, into the unused region.

(7)

The communication apparatus according to any one of (1) to (6) above, further including:

an optional extended footer generation section configured to generate, in the case where the packet to be transmitted in the extension mode includes an extended long packet in which data to be transmitted as a payload in the existing CSI-2 standard is placed, an optional extended footer that is arranged following a legacy payload into which the data is placed.

(8)

The communication apparatus according to any one of (1) to (7) above, further including:

a control section configured to control switching between transmission of a packet having a packet structure in compliance with the existing CSI-2 standard and transmission of a packet having a packet structure in the extension mode.

(9)

A communication method by a communication apparatus that performs communication, the communication method including:

placing setting information indicative of a condition set for data to be transmitted in a packet to generate a packet header in compliance with an existing CSI-2 standard; and generating an extended header into which the setting information is to be placed separately from the packet header, in which extension mode setting information indicative of whether or not an extension mode using the extended header is used is placed into an unused region defined as a region that is not used in the existing CSI-2 standard with respect to a data type that includes the setting information indicative of a type of the data to be transmitted in the packet.

(10)

A program for causing a computer of a communication apparatus that performs communication, to execute communication processing including:

placing setting information indicative of a condition set for data to be transmitted in a packet to generate a packet header in compliance with an existing CSI-2 standard; and generating an extended header into which the setting information is to be placed separately from the packet header, in which extension mode setting information indicative of whether or not an extension mode using the extended header is used is placed into an unused region defined as a region that is not used in the existing CSI-2 standard with respect to a data type that includes the setting information indicative of a type of the data to be transmitted in the packet.

(11)

A communication apparatus including:

a packet header detection section configured to detect a packet header in which setting information indicative of a condition set for data to be transmitted in a packet is placed, according to an existing CSI-2 standard; and an interpretation section configured to interpret the setting information placed in an extended header separate from the packet header, in which the packet header detection section causes switching to be performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is used.

(12)

The communication apparatus according to (11) above, in which the interpretation section receives, as the extended header, an extended payload header arranged at a top of a payload in compliance with the existing CSI-2 standard and interprets the setting information placed in the extended payload header.

(13)

The communication apparatus according to (11) above, in which the interpretation section receives, as the extended header, an extended packet header arranged following the packet header so as to extend a standard for the packet header and interprets the setting information placed in the extended header.

(14)

The communication apparatus according to any one of (11) to (13) above, in which, in the case where optional extended header setting information placed in the extended header indicates that an optional extended header transmitted selectively according to a use is transmitted, the interpretation section receives the optional extended header following the extended header and interprets the setting information placed in the optional extended header.

(15)

The communication apparatus according to any one of (11) to (14) above, in which the packet header detection section recognizes which of a plurality of types of the extension mode prepared as the extension mode is used, according to extension mode type information placed in the unused region.

(16)

The communication apparatus according to any one of (11) to (15) above, in which, in the case where the packet to be transmitted in the extension mode includes an extended long packet in which data to be transmitted as a payload in the existing CSI-2 standard is placed, the interpretation section receives an optional extended footer arranged following a legacy payload into which the data is placed, and interprets the optional extended footer.

(17)

A communication method by a communication apparatus that performs communication, the communication method including:

detecting a packet header in which setting information indicative of a condition set for data to be transmitted in a packet is placed, according to an existing CSI-2 standard; and interpreting the setting information placed in an extended header separate from the packet header, in which switching is performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is use.

(18)

A program for causing a computer of a communication apparatus that performs communication, to execute communication processing including:

detecting a packet header in which setting information indicative of a condition set for data to be transmitted in a packet is placed, according to an existing CSI-2 standard; and interpreting the setting information placed in an extended header separate from the packet header, in which switching is performed between reception of a packet having a packet structure in compliance with the existing CSI-2 standard and reception of a packet having a packet structure in an extension mode, according to extension mode setting information that is placed into an unused region defined as a region not used in the existing CSI-2 standard with respect to a data type including the setting information indicative of a type of the data to be transmitted in the packet and that indicates whether or not the extension mode using the extended header is used.

It is to be noted that the present embodiment is not restricted to the embodiments described hereinabove and that various alterations are possible without departing the subject matter of the present disclosure. Further, the advantageous effects described in the present specification are exemplary and are not restrictive, and other advantageous effects may be given.

REFERENCE SIGNS LIST

11 Communication system, 21 Image sensor, 22 Application processor, 23 and 24 Bus, 25 Serializer, 26 Deserializer, 27 Bus, 31 Extension mode compatible CSI-2 transmission circuit, 32 Extension mode compatible CSI-2 reception circuit, 33 CSI-2 reception circuit, 34 SerDes transmission circuit, 35 SerDes reception circuit, 36 CSI-2 transmission circuit, 41 Pixel, 42 AD converter, 43 Image processing section, 44 Pixel CRC calculation section, 45 Physical layer processing section, 46 I2C/I3C slave, 47 Register, 51 Packing section, 52 Packet header generation section, 53 Payload header generation section, 54 Payload footer generation section, 55 and 56 Selection section, 57 CRC calculation section, 58 Lane distribution section, 59 CCI slave, 60 Controller, 71 Physical layer processing section, 72 I2C/I3C master, 73 Register, 74 Controller, 81 Packet header detection section, 82 Lane merging section, 83 Interpretation section, 84 and 85 Selection section, 86 CRC calculation section, 87 Unpacking section, 88 CCI master

The invention claimed is:

1. A communication apparatus comprising:
a transmission circuitry; and
a controller configured to control the transmission circuitry,
wherein the transmission circuitry is configured to
generate a packet header in compliance with an existing Camera Serial Interface 2 (CSI-2) standard; and
generate an extended header that is separate from the packet header, wherein the extended header includes setting information indicative of one or more conditions set for data to be transmitted in a packet,
wherein the packet header includes extension mode setting information indicative of whether an extension mode using the extended header is used,
wherein the extension mode setting information is in an unused region of the packet header, the unused region defined as a region that is not used in the existing CSI-2 standard with respect to a data type, and
wherein the one or more conditions set for data to be transmitted in the packet includes the data type of the data to be transmitted in the packet.

2. The communication apparatus according to claim 1, wherein the transmission circuitry is further configured to generate, as the extended header, an extended payload header that is arranged at a top of a payload in compliance with the existing CSI-2 standard.

3. The communication apparatus according to claim 1, wherein the transmission circuitry includes a physical layer processing circuitry that is configured to switch between and execute both of physical layer processes for C-PHY and D-PHY.

4. The communication apparatus according to claim 1, wherein the transmission circuitry is further configured to place, optional extended header setting information indicative of whether an optional extended header selectively transmitted according to a use is to be transmitted, into the extended header.

5. The communication apparatus according to claim 4, wherein, in a case where the optional extended header is to be transmitted, the transmission circuitry is further configured to
place, as the optional extended header setting information indicating that the optional extended header is to be transmitted, an OePH selection flag, an MC (Message Count), and an RSID (in-vehicle line number and SourceID) into the extended header, and
generate the optional extended header following the extended header.

6. The communication apparatus according to claim 1, wherein the extension mode is one type from a plurality of types.

7. The communication apparatus according to claim 1, wherein the transmission circuitry is further configured to generate, in a case where the packet to be transmitted in the extension mode includes an extended long packet in which data to be transmitted as a payload in the existing CSI-2 standard is placed, an optional extended footer that is arranged following a legacy payload into which the data is placed, wherein
a (WC (Word Count)+1)th byte is transmitted following the optional extended footer, as a CRC (Cyclic Redundancy Check).

8. The communication apparatus according to claim 1, wherein the controller is further configured to control the transmission circuitry to switch between transmission of the packet having a first packet structure in compliance with the existing CSI-2 standard and transmission of the packet having a second packet structure in the extension mode, according to data content of a transmission target.

9. A communication method comprising:
generating, with a transmission circuitry, a packet header in compliance with an existing Camera Serial Interface 2 (CSI-2) standard; and
generating, with the transmission circuitry, an extended header that is separate from the packet header, wherein the extended header includes setting information indicative of one or more conditions set for data to be transmitted in a packet, wherein
the packet header includes extension mode setting information indicative of whether an extension mode using the extended header is used,
the extension mode setting information in an unused region of the packet header, the unused region defined as a region that is not used in the existing CSI-2 standard with respect to a data type, and wherein the one or more conditions set for data to be transmitted in the packet includes the data type of the data to be transmitted in the packet.

10. A non-transitory computer-readable medium comprising a program that, when executed by an electronic processor, causes the electronic processor to perform a set of operations comprising:

generating a packet header in compliance with an existing Camera Serial Interface 2 (CSI-2) standard; and generating an extended header that is separate from the packet header, wherein the extended header includes setting information indicative of one or more conditions set for data to be transmitted in a packet, wherein the packet header includes extension mode setting information indicative of whether an extension mode using the extended header is used, and the extension mode setting information in an unused region of the packet header, the unused region defined as a region that is not used in the existing CSI-2 standard with respect to a data type, and wherein the one or more conditions set for data to be transmitted in the packet includes the data type of the data to be transmitted in the packet.

11. A communication apparatus comprising:

a reception circuitry; and a controller configured to control the reception circuitry, wherein the reception is configured to detect a packet header in which setting information indicative of a condition set for data to be transmitted in a packet is placed, according to an existing Camera Serial Interface 2 (CSI-2) standard, and interpret the setting information placed in an extended header separate from the packet header, wherein the reception circuitry is further configured to switch between reception of the packet having a first packet structure in compliance with the existing CSI-2 standard and reception of the packet having a second packet structure in an extension mode, according to extension mode setting information that is placed into an unused region defined as a region not used in the existing CSI-2 standard with respect to a data type including the setting information indicative of a type of the data to be transmitted in the packet and that indicates whether the extension mode using the extended header is used.

12. The communication apparatus according to claim 11, wherein the reception circuitry is further configured to receive, as the extended header, an extended payload header arranged at a top of a payload in compliance with the existing CSI-2 standard, and interpret the setting information placed in the extended payload header.

13. The communication apparatus according to claim 11, further comprising:

a physical layer processing circuitry configured to switch between and execute both of physical layer processes for C-PHY and D-PHY.

14. The communication apparatus according to claim 11, wherein, in a case where optional extended header setting information placed in the extended header indicates that an optional extended header transmitted selectively according to a use is transmitted, the reception circuitry is further configured to receive the optional extended header following the extended header, and interpret, as the setting information placed in the optional extended header, an OePH selection flag, an MC (Message Count), and an RSID (in-vehicle line number and SourceID).

15. The communication apparatus according to claim 11, wherein the reception circuitry is further configured to recognize which of a plurality of types of the extension mode prepared as the extension mode is used, according to extension mode type information placed in the unused region.

16. The communication apparatus according to claim 11, wherein, in a case where the packet to be transmitted in the extension mode includes an extended long packet in which data to be transmitted as a payload in the existing CSI-2 standard is placed, the reception circuitry is further configured to receive an optional extended footer arranged following a legacy payload into which the data is placed, and interpret the optional extended footer, and wherein a (WC (Word Count)+1)th byte is received following the optional extended footer, as a CRC (Cyclic Redundancy Check).

17. A communication method comprising:

detecting, with a reception circuitry, a packet header in which setting information indicative of a condition set for data to be transmitted in a packet is placed, according to an existing Camera Serial Interface 2 (CSI-2) standard; and interpreting, with the reception circuitry, the setting information placed in an extended header separate from the packet header; and switching, with the reception circuitry, between reception of the packet having a first packet structure in compliance with the existing CSI-2 standard and reception of the packet having a second packet structure in an extension mode, according to extension mode setting information that is placed into an unused region defined as a region not used in the existing CSI-2 standard with respect to a data type including the setting information indicative of a type of the data to be transmitted in the packet and that indicates whether the extension mode using the extended header is used.

18. A non-transitory computer-readable medium comprising a program that, when executed by an electronic processor, causes the electronic processor to perform a set of operations comprising:

detecting a packet header in which setting information indicative of a condition set for data to be transmitted in a packet is placed, according to an existing Camera Serial Interface 2 (CSI-2) standard;

interpreting the setting information placed in an extended header separate from the packet header; and switching between reception of the packet having a first packet structure in compliance with the existing CSI-2 standard and reception of the packet having a second packet structure in an extension mode, according to extension mode setting information that is placed into an unused region defined as a region not used in the existing CSI-2 standard with respect to a data type including the setting information indicative of a type of the data to be transmitted in the packet and that indicates whether the extension mode using the extended header is used.

19. The non-transitory computer-readable medium according to claim 18, wherein, in a case where optional extended header setting information placed in the extended header indicates that an optional extended header transmitted selectively according to a use is transmitted, the set of operation further includes receiving the optional extended header following the extended header; and interpreting, as the setting information placed in the optional extended header, an OePH selection flag, an MC (Message Count), and an RSID (in-vehicle line number and SourceID).

20. The communication method according to claim 17, wherein, in a case where optional extended header setting information placed in the extended header indicates that an optional extended header transmitted selectively according to a use is transmitted, the method further comprising:

receiving the optional extended header following the extended header; and interpreting, as the setting information placed in the optional extended header, an OePH selection flag, an MC (Message Count), and an RSID (in-vehicle line number and SourceID).

* * * * *